US012743836B2

(12) United States Patent
Karageorgos et al.

(10) Patent No.: US 12,743,836 B2
(45) Date of Patent: Sep. 22, 2026

(54) SYSTEM AND METHOD FOR METAL ARTIFACT REDUCTION IN MEDICAL IMAGES USING A DENOISING DIFFUSION PROBABILISTIC MODEL

(71) Applicants: GE Precision Healthcare LLC, Waukesha, WI (US); Rensselaer Polytechnic Institute, Troy, NY (US)

(72) Inventors: Grigorios Marios Karageorgos, Brooklyn, NY (US); Bruno De Man, Clifton Park, NY (US); Ge Wang, Loudonville, NY (US); Wenjun Xia, Troy, NY (US); Chuang Niu, Troy, NY (US)

(73) Assignees: GE Precision Healthcare LLC, Waukesha, WI (US); Rensselaer Polytechnic Institute, Troy, NC (US)

( * ) Notice: Subject to any disclaimer, the term of this patent is extended or adjusted under 35 U.S.C. 154(b) by 167 days.

(21) Appl. No.: 18/680,592

(22) Filed: May 31, 2024

(65) Prior Publication Data

US 2024/0404132 A1 Dec. 5, 2024

Related U.S. Application Data

(60) Provisional application No. 63/505,358, filed on May 31, 2023.

(51) Int. Cl.
*G06T 12/30* (2026.01)
*G06T 5/70* (2024.01)
(Continued)

(52) U.S. Cl.
CPC ................ *G06T 12/30* (2026.01); *G06T 5/70* (2024.01); *G06T 5/77* (2024.01); *G06T 7/11* (2017.01);
(Continued)

(58) Field of Classification Search
None
See application file for complete search history.

(56) References Cited

U.S. PATENT DOCUMENTS

2013/0039556 A1* 2/2013 Kachelriess ............. A61B 6/00 382/131
2021/0065414 A1* 3/2021 Do .......................... G06T 12/30
(Continued)

OTHER PUBLICATIONS

A. Brock, J. Donahue, and K. Simonyan, "Large Scale GAN Training for High Fidelity Natural Image Synthesis." arXiv, Feb. 25, 2019.

(Continued)

*Primary Examiner* — Leon Flores
(74) *Attorney, Agent, or Firm* — SPQ IP LLC

(57) ABSTRACT

Various systems and methods are provided for MAR in CT images. A corrupted CT image, of a region of interest (ROI) of a subject, including artifacts caused by a metal object in the subject may be acquired. A corrupted sinogram including a corrupted region of corrupted data caused by the metal object and an uncorrupted region of uncorrupted data may be generated. A mask sinogram that delineates the corrupted region of the corrupted data may be generated. A corrected sinogram including the uncorrupted region of the uncorrupted data and an inpainted region of inpainted data corresponding to the corrupted region may be generated using a denoising diffusion probabilistic model, the corrupted sinogram, and the mask sinogram. A corrected CT image, of the ROI of the subject, that includes reduced artifacts relative to the artifacts in the corrupted CT image may be generated based on the corrected sinogram.

20 Claims, 21 Drawing Sheets

(51) Int. Cl.
*G06T 5/77* (2024.01)
*G06T 7/11* (2017.01)

(52) U.S. Cl.
CPC ............... *G06T 2207/10081* (2013.01); *G06T 2207/20081* (2013.01); *G06T 2211/448* (2023.08)

(56) References Cited

U.S. PATENT DOCUMENTS

| | | | | |
|---|---|---|---|---|
| 2024/0071052 | A1* | 2/2024 | Peng | G06T 12/30 |
| 2024/0135603 | A1* | 4/2024 | Favazza | G06T 12/10 |

OTHER PUBLICATIONS

A. Kirillov et al., "Segment Anything," presented at the Proceedings of the IEEE/CVF International Conference on Computer Vision, 2023, pp. 4015-4026.
A. Lugmayr, M. Danelljan, A. Romero, F. Yu, R. Timofte, and L. Van Gool, "RePaint: Inpainting using Denoising Diffusion Probabilistic Models." arXiv, Aug. 31, 2022.
A. Nichol and P. Dhariwal, "Improved Denoising Diffusion Probabilistic Models." arXiv, Feb. 18, 2021. doi: 10.48550/arXiv.2102.09672.
B. D. Man et al., "CatSim: a new computer assisted tomography simulation environment," in Medical Imaging 2007: Physics of Medical Imaging, SPIE, Mar. 2007, pp. 856-863. doi: 10.1117/12.710713.
B. De Man, J. Nuyts, P. Dupont, G. Marchal, and P. Suetens, "Metal streak artifacts in X-ray computed tomography: a simulation study," IEEE Transactions on Nuclear Science, vol. 46, No. 3, pp. 691-696, Jun. 1999, doi: 10.1109/23.775600.
B. De Man, J. Nuyts, P. Dupont, G. Marchal, and P. Suetens, "Reduction of metal streak artifacts in X-ray computed tomography using a transmission maximum a posteriori algorithm," IEEE Transactions on Nuclear Science, vol. 47, No. 3, pp. 977-981, Jun. 2000, doi: 10.1109/23.856534.
B. E. H. Claus, Y. Jin, L. A. Gjesteby, and G. Wang, "Metal-Artifact Reduction Using Deep-Learning Based Sinogram Completion: Initial Results". Jun. 2017.
Busi, Matteo, et al. "Metal artifact reduction in spectral X-ray CT using spectral deep learning." Journal of Imaging 8.3 (2022): 77.
C. Saharia et al., "Palette: Image-to-Image Diffusion Models," in ACM SIGGRAPH 2022 Conference Proceedings, in SIGGRAPH '22. New York, NY, USA: Association for Computing Machinery, Jul. 2022, pp. 1-10. doi: 10.1145/3528233.3530757.
D. Giantsoudi et al., "Metal artifacts in computed tomography for radiation therapy planning: dosimetric effects and impact of metal artifact reduction," Phys. Med. Biol., vol. 62, No. 8, p. R49, Mar. 2017, doi: 10.1088/1361-6560/aa5293.
Dhariwal, Prafulla, and Alexander Nichol. "Diffusion models beat gans on image synthesis." Advances in Neural Information Processing Systems 34 (2021): 8780-8794.
E. Meyer, R. Raupach, M. Lell, B. Schmidt, and M. Kachelrieß, "Normalized metal artifact reduction (NMAR) in computed tomography," Medical Physics, vol. 37, No. 10, pp. 5482-5493, 2010, doi: 10.1118/1.3484090.
Ghani et al., Fast Enhanced CT Metal Artifact Reduction using Data Domain Deep Learning, Aug. 1, 2019.
G. Liu, F. A. Reda, K. J. Shih, T.-C. Wang, A. Tao, and B. Catanzaro, "Image Inpainting for Irregular Holes Using Partial Convolutions," presented at the Proceedings of the European Conference on Computer Vision (ECCV), 2018, pp. 85-100.
G. Wang, D. L. Snyder, J. A. O'Sullivan, and M. W. Vannier, "Iterative deblurring for CT metal artifact reduction," IEEE Transactions on Medical Imaging, vol. 15, No. 5, pp. 657-664, Oct. 1996, doi: 10.1109/42.538943.
G. Wang, M. W. Vannier, and P.-C. Cheng, "Iterative X-ray Cone-Beam Tomography for Metal Artifact Reduction and Local Region Reconstruction," Microscopy and Microanalysis, vol. 5, No. 1, pp. 58-65, Jan. 1999, doi: 10.1017/S1431927699000057.
Gottschalk, Tristan M., et al. "DL-based inpainting for metal artifact reduction for cone beam CT using metal path length information." Medical Physics 50.1 (2023): 128-141.
H. Cao et al., "Swin-Unet: Unet-Like Pure Transformer for Medical Image Segmentation," in Computer Vision—ECCV 2022 Workshops, L. Karlinsky, T. Michaeli, and K. Nishino, Eds., Cham: Springer Nature Switzerland, 2023, pp. 205-218. doi: 10.1007/978-3-031-25066-8_9.
H. S. Park, D. Hwang, and J. K. Seo, "Metal Artifact Reduction for Polychromatic X-ray CT Based on a Beam-Hardening Corrector," IEEE Transactions on Medical Imaging, vol. 35, No. 2, pp. 480-487, Feb. 2016, doi: 10.1109/TMI.2015.2478905.
J. Ho, A. Jain, and P. Abbeel, "Denoising Diffusion Probabilistic Models," in Advances in Neural Information Processing Systems, Curran Associates, Inc., 2020, pp. 6840-6851.
J. Hsieh, R. C. Molthen, C. A. Dawson, and R. H. Johnson, "An iterative approach to the beam hardening correction in cone beam CT," Medical Physics, vol. 27, No. 1, pp. 23-29, 2000, doi: 10.1118/1.598853.
J. Yu, Z. Lin, J. Yang, X. Shen, X. Lu, and T. Huang, "Free-Form Image Inpainting with Gated Convolution." arXiv, Oct. 21, 2019.
K. Yan, X. Wang, L. Lu, and R. M. Summers, "DeepLesion: automated mining of large-scale lesion annotations and universal lesion detection with deep learning," JMI, vol. 5, No. 3, p. 036501, Jul. 2018, doi: 10.1117/1.JMI.5.3.036501.
L. Gjesteby et al., "Deep learning methods for CT image-domain metal artifact reduction," in Developments in X-Ray Tomography XI, SPIE, Sep. 2017, pp. 147-152. doi: 10.1117/12.2274427.
L. Gjesteby et al., "Metal Artifact Reduction in CT: Where Are We After Four Decades?," IEEE Access, vol. 4, pp. 5826-5849, 2016, doi: 10.1109/ACCESS.2016.2608621.
L. Yu, Z. Zhang, X. Li, and L. Xing, "Deep Sinogram Completion with Image Prior for Metal Artifact Reduction in CT Images," IEEE Trans Med Imaging, vol. 40, No. 1, pp. 228-238, Jan. 2021, doi: 10.1109/TMI.2020.3025064.
M. Bal and L. Spies, "Metal artifact reduction in CT using tissue-class modeling and adaptive prefiltering," Medical Physics, vol. 33, No. 8, pp. 2852-2859, 2006, doi: 10.1118/1.2218062.
M. Kachelrieß, O. Watzke, and W. A. Kalender, "Generalized multi-dimensional adaptive filtering for conventional and spiral single-slice, multi-slice, and cone-beam CT," Medical Physics, vol. 28, No. 4, pp. 475-490, 2001, doi: 10.1118/1.1358303.
M. U. Ghani and W. C. Karl, "Fast Enhanced CT Metal Artifact Reduction Using Data Domain Deep Learning," IEEE Transactions on Computational Imaging, vol. 6, pp. 181-193, 2020, doi: 10.1109/TCI.2019.2937221.
M. Wu et al., "XCIST—an open access x-ray/CT simulation toolkit," Phys. Med. Biol., vol. 67, No. 19, p. 194002, Sep. 2022, doi: 10.1088/1361-6560/ac9174.
N. Goren, T. Dowrick, J. Avery, and D. Holder, "UCLH Stroke EIT Dataset—Radiology Data." Zenodo, Aug. 3, 2017. doi: 10.5281/zenodo.1199398.
O. Ronneberger, P. Fischer, and T. Brox, "U-Net: Convolutional Networks for Biomedical Image Segmentation," in Medical Image Computing and Computer-Assisted Intervention—MICCAI 2015, N. Navab, J. Hornegger, W. M. Wells, and A. F. Frangi, Eds., in Lecture Notes in Computer Science. Cham: Springer International Publishing, 2015, pp. 234-241. doi: 10.1007/978-3-319-24574-4_28.
P. Dhariwal and A. Nichol, "Diffusion Models Beat GANs on Image Synthesis," in Advances in Neural Information Processing Systems, Curran Associates, Inc., 2021, pp. 8780-8794.
R. Rombach, A. Blattmann, D. Lorenz, P. Esser, and B. Ommer, "High-Resolution Image Synthesis with Latent Diffusion Models," in 2022 IEEE/CVF Conference on Computer Vision and Pattern Recognition (CVPR), New Orleans, LA, USA: IEEE, Jun. 2022, pp. 10674-10685. doi: 10.1109/CVPR52688.2022.01042.
T. M. Gottschalk, A. Maier, F. Kordon, and B. W. Kreher, "DL-based inpainting for metal artifact reduction for cone beam CT using metal path length information," Medical Physics, vol. 50, No. 1, pp. 128-141, 2023, doi: 10.1002/mp.15909.

(56) References Cited

OTHER PUBLICATIONS

W. A. Kalender, R. Hebel, and J. Ebersberger, "Reduction of CT artifacts caused by metallic implants," Radiology, vol. 164, No. 2, pp. 576-577, Aug. 1987, doi: 10.1148/radiology.164.2.3602406.
W.-A. Lin et al., "DuDoNet: Dual Domain Network for CT Metal Artifact Reduction," presented at the Proceedings of the IEEE/CVF Conference on Computer Vision and Pattern Recognition, 2019, pp. 10512-10521.
Wang, Hong, et al. "DICDNet: deep interpretable convolutional dictionary network for metal artifact reduction in CT images." IEEE Transactions on Medical Imaging 41.4 (2021): 869-880.
Wang, Hong, et al. "InDuDoNet+: A deep unfolding dual domain network for metal artifact reduction in CT images." Medical Image Analysis 85 (2023): 102729.
X. Huang, J. Wang, F. Tang, T. Zhong, and Y. Zhang, "Metal artifact reduction on cervical CT images by deep residual learning," BioMed Eng OnLine, vol. 17, No. 1, p. 175, Nov. 2018, doi: 10.1186/s12938-018-0609-y.
X. Zhang, J. Wang, and L. Xing, "Metal artifact reduction in x-ray computed tomography (CT) by constrained optimization," Med Phys, vol. 38, No. 2, pp. 701-711, Feb. 2011, doi: 10.1118/1.3533711.
Y. Fan, J. Pack, and B. D. Man, "A virtual imaging trial framework to study cardiac CT blooming artifacts," in 7th International Conference on Image Formation in X-Ray Computed Tomography, SPIE, Oct. 2022, pp. 247-251. doi: 10.1117/12.2646407.
Y. Zhang and H. Yu, "Convolutional Neural Network Based Metal Artifact Reduction in X-Ray Computed Tomography," IEEE Transactions on Medical Imaging, vol. 37, No. 6, pp. 1370-1381, Jun. 2018, doi: 10.1109/TMI.2018.2823083.

* cited by examiner

SERVER
224
COMMUNICATION INTERFACE
220
USER INPUT DEVICE
218
PICTURE ARCHIVING AND COMMUNICATIONS SYSTEM (PACS)
222
DISPLAY
216
PROCESSOR
212
MEMORY
214
TABLE
210
202
204
206
208

700

ACQUIRE A CORRUPTED COMPUTED TOMOGRAPHY (CT) IMAGE, OF A REGION OF INTEREST (ROI) OF A SUBJECT, INCLUDING ARTIFACTS CAUSED BY METAL OBJECT IN THE SUBJECT — 710

GENERATE A CORRUPTED SINOGRAM INCLUDING A CORRUPTED REGION OF CORRUPTED DATA CAUSED BY THE METAL OBJECT AND AN UNCORRUPTED REGION OF UNCORRUPTED DATA — 720

GENERATE A MASK SINOGRAM THAT DELINEATES THE CORRUPTED REGION OF THE CORRUPTED DATA — 730

GENERATE A CORRECTED SINOGRAM INCLUDING THE UNCORRUPTED REGION OF THE UNCORRUPTED DATA AND AN INPAINTED REGION OF INPAINTED DATA CORRESPONDING TO THE CORRUPTED REGION, USING A DENOISING DIFFUSION PROBABILISTIC MODEL (DDPM), THE CORRUPTED SINOGRAM, AND THE MASK SINOGRAM — 740

GENERATE A CORRECTED CT IMAGE, OF THE ROI OF THE SUBJECT, THAT INCLUDES REDUCED ARTIFACTS RELATIVE TO THE ARTIFACTS IN THE CORRUPTED CT IMAGE, BASED ON THE CORRECTED SINOGRAM — 750

DISPLAY THE CORRECTED CT IMAGE — 760

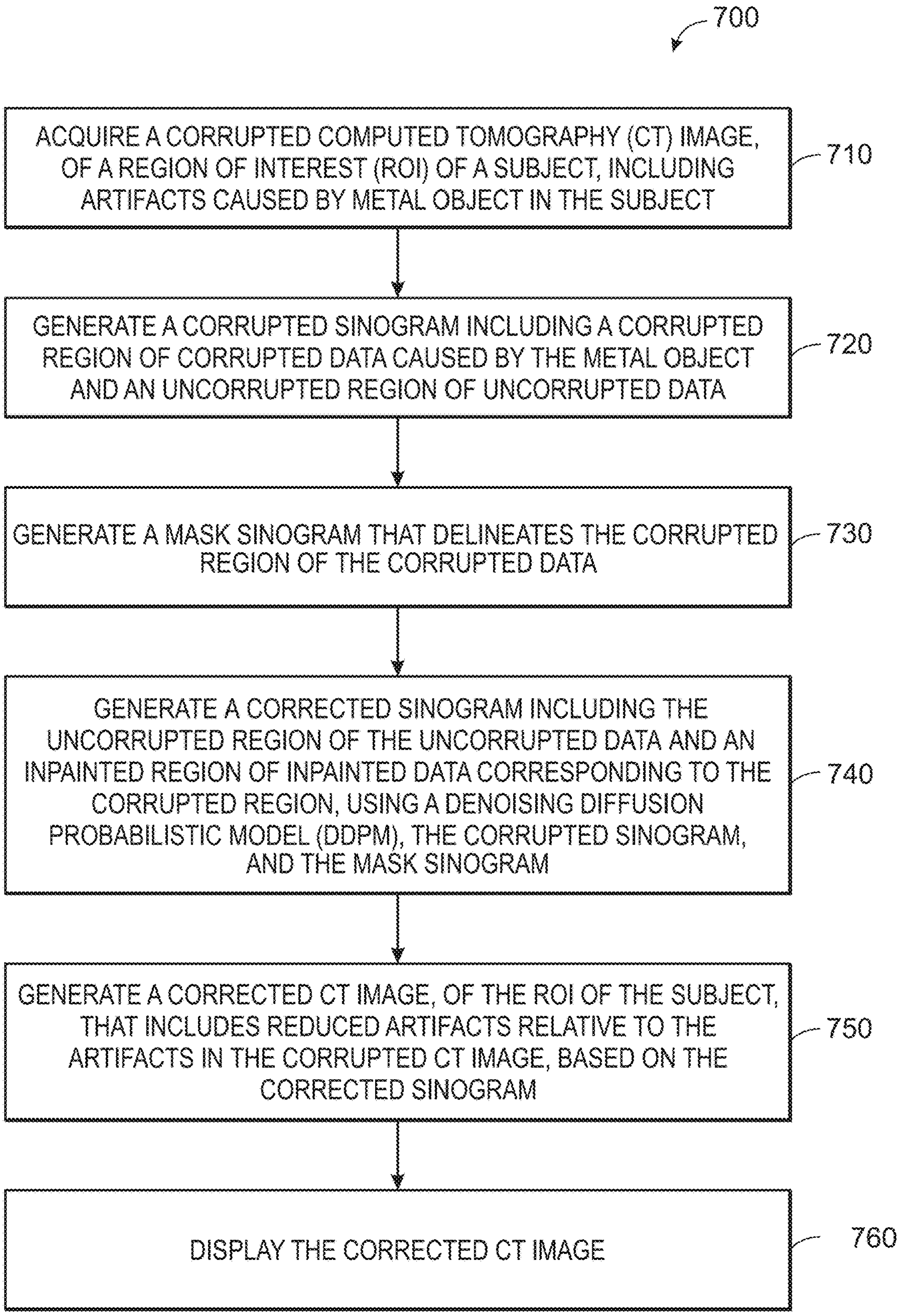

FIG. 7

SYSTEM AND METHOD FOR METAL ARTIFACT REDUCTION IN MEDICAL IMAGES USING A DENOISING DIFFUSION PROBABILISTIC MODEL

CROSS-REFERENCE TO RELATED APPLICATION(S)

This application claims priority from U.S. Provisional Application No. 63/505,358, filed on May 31, 2023, in the U.S. Patent & Trademark Office, the disclosure of which is incorporated herein by reference in its entirety.

STATEMENT REGARDING FEDERALLY SPONSORED RESEARCH AND DEVELOPMENT

This invention was made with government support under Grant No. EB031102 awarded by the National Institutes of Health (NIH). The Government has certain rights in the invention.

TECHNICAL FIELD

The present disclosure relates to systems and methods for metal artifact reduction (MAR) in medical images. More specifically, the present disclosure relates to systems and methods for training and using a denoising diffusion probabilistic model (DDPM) for MAR in medical images.

BACKGROUND

A computed tomography (CT) imaging system may include a gantry that supports a rotational frame, an X-ray source, and an X-ray detector. During a CT scan of a subject, the gantry may rotate the rotational frame around the subject to change an angle at which an X-ray beam emitted by the X-ray source intersects the subject. The X-ray detector may acquire projection data by detecting radiation of the X-ray beam that is attenuated by the subject. In some cases, the subject may include metal objects located within the subject. For example, the subject may include a dental filing, an orthopedic prosthesis, a stent, surgical hardware, or the like, located within the subject. The metal object might significantly attenuate the X-ray beam which may cause deleterious effects such as photon starvation, beam hardening, scattered radiation, or the like. These effects may result in artifacts that manifest in the CT image. For instance, the artifacts may include bright and dark bands that emanate from the metal object. Partial volume effects and aliasing effects may also cause artifacts in the CT image. These artifacts may obscure underlying anatomic details in the CT image, which may reduce the diagnostic confidence of clinical examinations, reduce the accuracy of radiation therapy planning, or the like.

SUMMARY

This summary introduces concepts that are described in more detail in the detailed description. It should not be used to identify essential features of the claimed subject matter, nor to limit the scope of the claimed subject matter.

In an aspect, a method may include acquiring a corrupted computed tomography (CT) image, of a region of interest (ROI) of a subject, including artifacts caused by a metal object in the subject; generating a corrupted sinogram, corresponding to the corrupted CT image, including a corrupted region of corrupted data caused by the metal object and an uncorrupted region of uncorrupted data; generating a mask sinogram that delineates the corrupted region of the corrupted data; generating a corrected sinogram including the uncorrupted region of the uncorrupted data and an inpainted region of inpainted data corresponding to the corrupted region, using a denoising diffusion probabilistic model, the corrupted sinogram, and the mask sinogram; and generating a corrected CT image, of the ROI of the subject, that includes reduced artifacts relative to the artifacts in the corrupted CT image, based on the corrected sinogram.

In another aspect, an imaging system may include a memory configured to store instructions; and one or more processors configured to execute the instructions to perform operations comprising: acquiring a corrupted computed tomography (CT) image, of a region of interest (ROI) of a subject, including artifacts caused by a metal object in the subject; generating a corrupted sinogram, corresponding to the corrupted CT image, including a corrupted region of corrupted data caused by the metal object and an uncorrupted region of uncorrupted data; generating a mask sinogram that delineates the corrupted region of the corrupted data; generating a corrected sinogram including the uncorrupted region of the uncorrupted data and an inpainted region of inpainted data corresponding to the corrupted region, using a denoising diffusion probabilistic model, the corrupted sinogram, and the mask sinogram; and generating a corrected CT image, of the ROI of the subject, that includes reduced artifacts relative to the artifacts in the corrupted CT image, based on the corrected sinogram.

In yet another aspect, a non-transitory computer-readable medium may store instructions that, when executed by one or more processors of an imaging system, cause the one or more processors to perform operations comprising: acquiring a corrupted computed tomography (CT) image, of a region of interest (ROI) of a subject, including artifacts caused by a metal object in the subject; generating a corrupted sinogram, corresponding to the corrupted CT image, including a corrupted region of corrupted data caused by the metal object and an uncorrupted region of uncorrupted data; generating a mask sinogram that delineates the corrupted region of the corrupted data; generating a corrected sinogram including the uncorrupted region of the uncorrupted data and an inpainted region of inpainted data corresponding to the corrupted region, using a denoising diffusion probabilistic model, the corrupted sinogram, and the mask sinogram; and generating a corrected CT image, of the ROI of the subject, that includes reduced artifacts relative to the artifacts in the corrupted CT image, based on the corrected sinogram.

BRIEF DESCRIPTION OF DRAWINGS

FIG. 7 is a flowchart of an example process for MAR in CT images using a DDPM.

DETAILED DESCRIPTION

Figure 1:
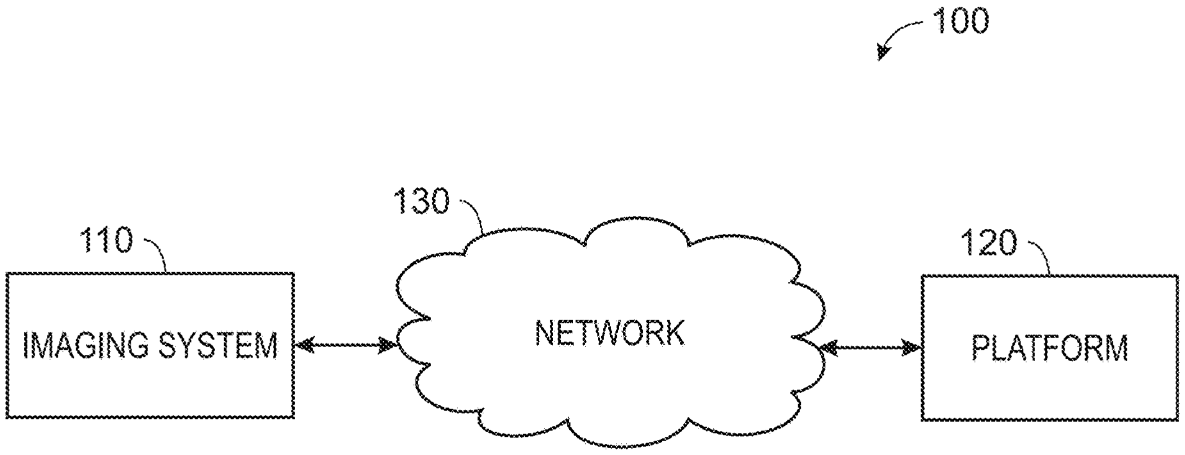
FIG. 1 is a diagram of an example system for MAR in medical images using a DDPM.

As addressed above, the inclusion of a metal object in a subject of a CT scan may result in corrupted projection data, which may cause artifacts in a reconstructed CT image. The artifacts may obscure underlying anatomic details in the CT image, which may reduce the diagnostic confidence of clinical examinations, reduce the accuracy of radiation therapy planning, or the like. In this way, the performance of the CT imaging system is inhibited, the performance of an application that utilizes the CT image is reduced, and patient safety may be compromised.

In some cases, techniques might be employed to correct physical effects that induce artifacts, such as noise, scatter, and beam hardening. However, these techniques might not be effective when severe artifacts are present in the CT image. In other cases, iterative MAR techniques might be employed to statistically down-weight, or completely ignore, corrupted projection data. In yet other cases, interpolation-based techniques might be employed to treat corrupted projection data as missing data, and replace the corrupted projection data using interpolation schemes. Further, artificial intelligence (AI) models (e.g., convolutional neural networks (CNNs), generative adversarial networks (GANs), or the like) may be used for MAR in medical images. These AI models may provide the ability to learn complex transformations from corrupted sinograms to uncorrupted sinograms or from corrupted images to uncorrupted images. However, these models might require training using a certain distribution of metal objects, which might limit the generalization capabilities of the models for unknown metal objects, unknown metal object locations, unknown metal object geometries, or the like.

Some embodiments herein provide an imaging system that utilizes a DDPM for MAR in medical images. For example, an imaging system may acquire a corrupted CT image, of an ROI of a subject, including artifacts caused by a metal object in the subject. The imaging system may generate a corrupted sinogram, corresponding to the corrupted CT image, including a corrupted region of corrupted data caused by the metal object and an uncorrupted region of uncorrupted data that is not affected by the metal object. The imaging system may generate a mask sinogram that delineates the corrupted region of the corrupted data. The imaging system may generate a corrected sinogram including the uncorrupted region of the uncorrupted data and an inpainted region of inpainted data corresponding to the corrupted region, using a DDPM, the corrupted sinogram, and the mask sinogram. The imaging system may generate a corrected CT image, of the ROI of the subject, that includes reduced artifacts relative to the artifacts in the corrupted CT image, based on the corrected sinogram. The imaging system may display the corrected CT image.

Some embodiments herein provide an improvement to imaging systems, an improvement to medical images, and an improvement to the technical field of MAR in medical imaging. For example, some embodiments herein may use a DDPM to remove corrupted data associated with a corrupted region of a corrupted sinogram caused by the inclusion of a metal object in a subject, and inpaint the corrupted region of the corrupted sinogram with inpainted data. The imaging system may generate an uncorrupted sinogram including uncorrupted data of an uncorrupted region and the inpainted data of the inpainted region, and generate a CT image using the uncorrupted sinogram. The CT image may include less artifacts relative to a CT image that is generated using the corrupted sinogram. Further, some embodiments herein provide an improvement to generalization capabilities of models for MAR in medical images. For example, some embodiments herein may train the DDPM using training images that do not depict metal objects. In this way, the DDPM may be unconditionally trained, which enhances the generalization capability of the DDPM across different types of metal objects, different placements of metal objects, different geometries of metal objects, or the like. Accordingly, in this way, some embodiments herein may provide an improvement over GAN-based or CNN-based approaches that may exhibit reduced generalization capabilities. Further, some embodiments herein provide an improvement to MAR in medical images. For example, some embodiments herein train the DDPM to perform MAR in the sinogram domain, which may result in improved reconstruction of CT images by addressing the source of the error in the sinogram domain as compared to rectifying the error in the image domain. Accordingly, in this way, some embodiments herein may improve the accuracy of medical images, may improve the outcomes of medical procedures that utilize medical images, improve subject safety, may improve outcomes, or the like.

FIG. 1 is a diagram of an example system 100 for MAR in medical images using a DDPM. As shown in FIG. 1, the example system 100 may include an imaging system 110, a platform 120, and a network 130. The imaging system 110 may be configured to generate a medical image of a subject. For example, the imaging system 110 may be a CT imaging system, an X-ray imaging system, a magnetic resonance (MR) imaging system, a positron emission tomography (PET) imaging system, a single-photon emission computed tomography (SPECT) imaging system, an ultrasound imaging system, a fluoroscopic X-ray imaging system, or the like. The medical image may be a medical image associated with an imaging modality of the imaging system 110. For example, the medical image may be a CT image, an X-ray image, an MR image, a PET image, a SPECT image, an ultrasound image, a fluoroscopic X-ray image, or the like. The image may be a two-dimensional (2D) image, a three-dimensional (3D) image, or the like. The subject may be a human, an animal, a phantom, or the like.

Although the embodiments herein are described in association with CT images and a CT imaging system, it should be understood that the embodiments herein are applicable to other medical imaging modalities and other imaging systems. Further, although the embodiments herein are described in association with MAR in medical images, it should be understood that the techniques are applicable to other situations where corrupted, or missing, data is replaced.

The platform 120 may be configured to generate a DDPM. For example, the platform 120 may be a server, a desktop computer, a laptop computer, a medical device, an imaging system, or the like. The network 130 may permit communication between the imaging system 110 and the platform 120. For example, the network 130 may be a local area network (LAN), a wide area network (WAN), a metropolitan area network (MAN), a cellular network, a private network, an ad hoc network, an intranet, the Internet, a fiber optic-based network, a wired network, a wireless network, or the like, and/or a combination of these or other types of networks. The number and arrangement of the system 100 are provided as an example. In practice, the system 100 may include additional systems, fewer systems, different systems, or differently arranged systems than those shown in FIG. 1. Additionally, or alternatively, a set of systems (e.g., one or more systems) of the system 100 may be integrated into a single system, and/or perform one or more functions described as being performed by another system, or set of systems, of the system 100.

Figure 2:
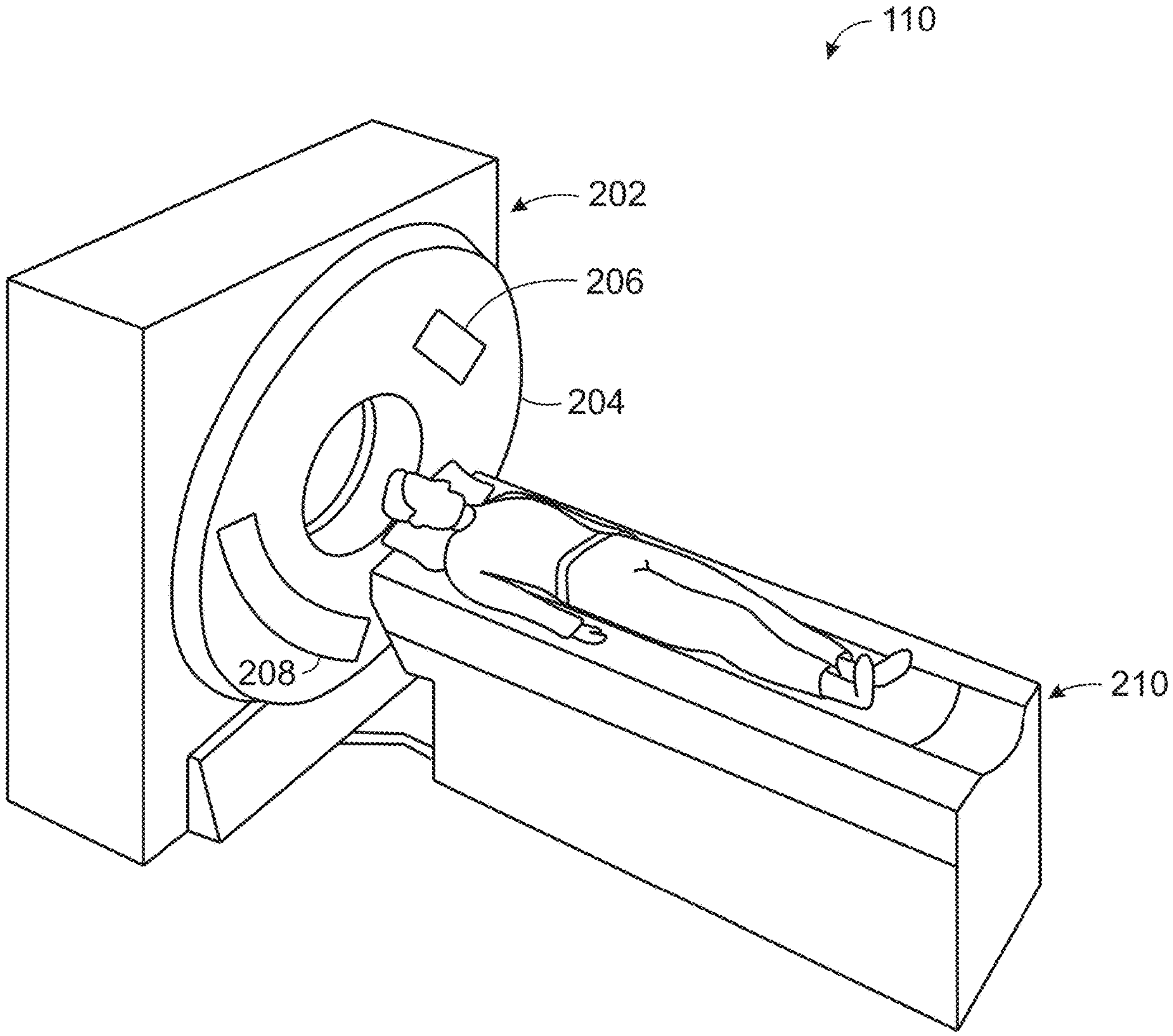
FIG. 2 is a perspective view of an example imaging system for generating medical images.

FIG. 2 is a perspective view of an example imaging system 110 for generating medical images. As shown in FIG. 2, the imaging system 110 may include a gantry 202, a rotational frame 204, an X-ray source 206, an X-ray detector 208, and a table 210. The gantry 202 may be configured to support the rotational frame 204, the X-ray source 206, and the X-ray detector 208. The rotational frame 204 may be configured to rotate the X-ray source 206 and the X-ray detector 208 around a subject that is positioned on the table 210. The X-ray source 206 may be configured to emit X-ray radiation in the form of an X-ray beam towards the subject and the X-ray detector 208. The X-ray detector 208 may be configured to detect X-ray radiation emitted by the X-ray source 206 and attenuated by the subject. The table 210 may be configured to support the subject during a scan of the subject. During a scan of the subject, the gantry 202 may rotate the rotational frame 204 around the subject to change an angle at which an X-ray beam emitted by the X-ray source 206 intersects the subject. The X-ray detector 208 may acquire projection data by detecting radiation of the X-ray beam.

Figure 3:
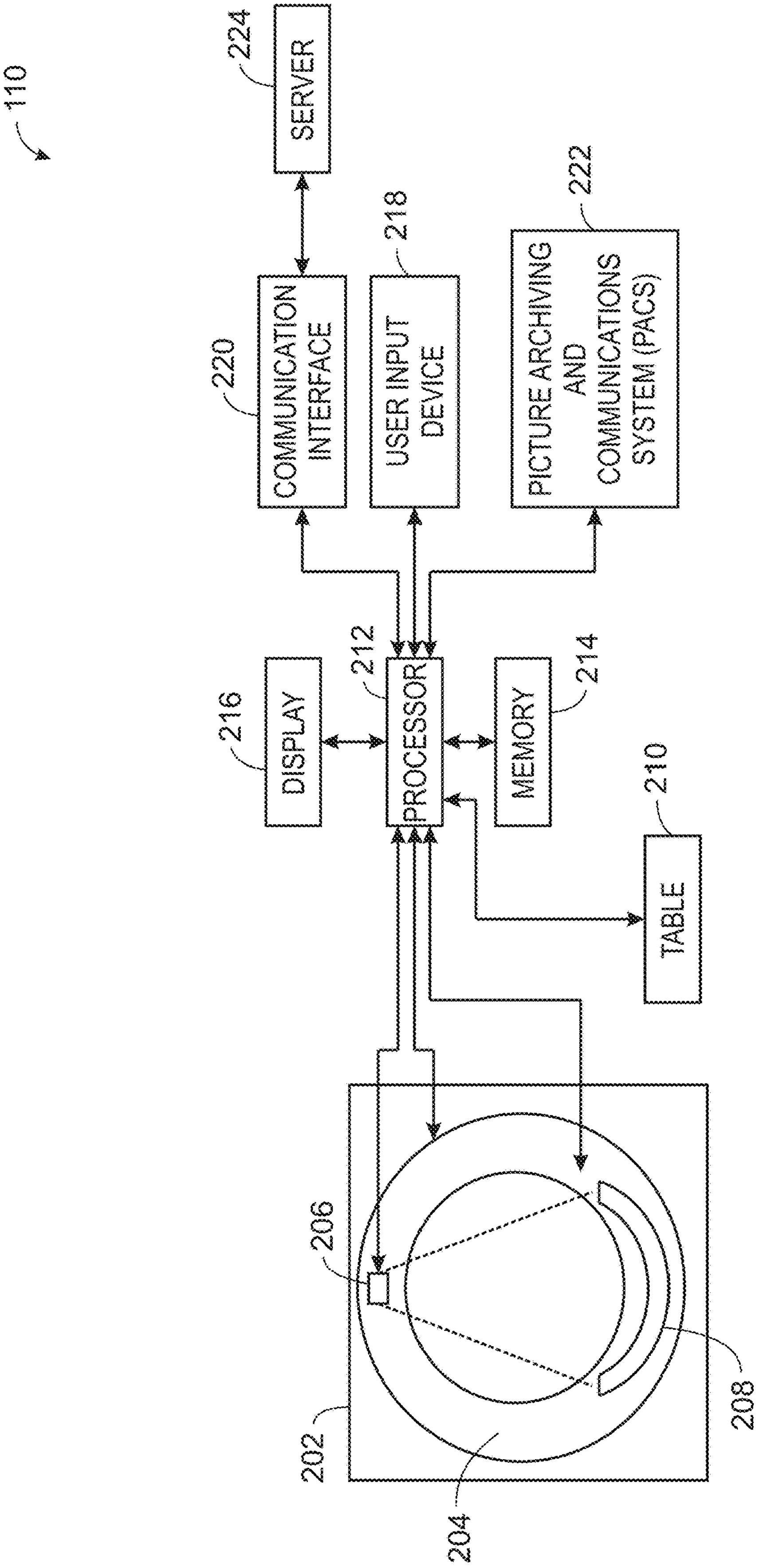
FIG. 3 is a diagram of components of an example imaging system for generating medical images.

FIG. 3 is a diagram of components of an example imaging system 110 for generating medical images. As shown in FIG. 3, the imaging system 110 may include a gantry 202, a rotational frame 204, an X-ray source 206, an X-ray detector 208, a table 210, a processor 212, a memory 214, a display 216, a user input device 218, a communication interface 220, a picture archiving and communications system (PACS) 222, and a server 224.

The processor 212 may be configured to control operations of the imaging system 110. For example, the processor 212 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or the like. The processor 212 may be implemented in hardware, firmware, or a combination of hardware and software. The processor 212 may include one or more processors 212 configured to perform the operations described herein. For example, a single processor 212 may be configured to perform all of the operations described herein. Alternatively, multiple processors 212, collectively, may be configured to perform all of the operations described herein, and each of the multiple processors 212 may be configured to perform a subset of the operations descried herein. For example, a first processor 212 may perform a first subset of the operations described herein, a second processor 212 may be configured to perform a second subset of the operations described herein, etc.

The processor 212 may be configured to control the gantry 202, movement of the rotational frame 204, the X-ray source 206, the X-ray detector 208, and movement of the table 210. The processor 212 may receive projection data generated during the scan, and generate a sinogram using the projection data. The sinogram may be a one-dimensional (1D) sinogram, a 2D sinogram, a 3D sinogram, or the like. The processor 212 may generate a medical image (e.g., a CT image) based on the sinogram. For example, the processor 212 may generate the medical image using a reconstruction technique, such as back-projection.

The memory 214 may be configured to store information and/or instructions for use by the processor 212. The memory 214 may be a non-transitory computer-readable medium. For example, the memory 214 may be a random access memory (RAM), a read only memory (ROM), a flash memory, a magnetic memory, an optical memory, or the like. The memory 214 may be configured to store instructions that, when executed by the processor 212, cause the processor 212 to perform the operations described herein.

The display 216 may be configured to display information. For example, the display 216 may be a monitor, a light-emitting diode (LED) display, a cathode ray tube, a projector display, a touchscreen, tablet computer, mobile phone, or the like. The display 216 may display medical images in real-time. For example, the display 216 may display the medical images within one second, two seconds, five seconds, etc., of the medical images being generated, a scan being completed, or the like.

The user input device 218 may be configured to receive a user input, and provide the user input to the processor 212. For example, the user input device 218 may be a touch screen display, a keyboard, a keypad, a mouse, a button, a switch, a microphone, or the like. Additionally, or alternatively, the user input device 218 may be configured to sense information. For example, the user input device 218 may sense information from an electro-magnetic positioning system, an inertial measurement system, an accelerometer, a gyroscope, an actuator, or the like.

The communication interface 220 may be configured to enable the processor 212 to communicate with other devices, such as via a wired connection, a wireless connection, or a combination of wired and wireless connections. For example, the communication interface 220 may include an Ethernet interface, an optical interface, a coaxial interface, an infrared interface, a radio frequency (RF) interface, a universal serial bus (USB) interface, a wireless fidelity (Wi-Fi) interface, a cellular network interface, or the like. The PACS 222 may be configured to communicate with external systems and/or networks to permit users at various locations to access the medical image. The server 224 may be configured to store one or more models as described herein. For example, the server 224 may be an on-premises server, a cloud server, a virtual machine, or the like.

Figure 4:
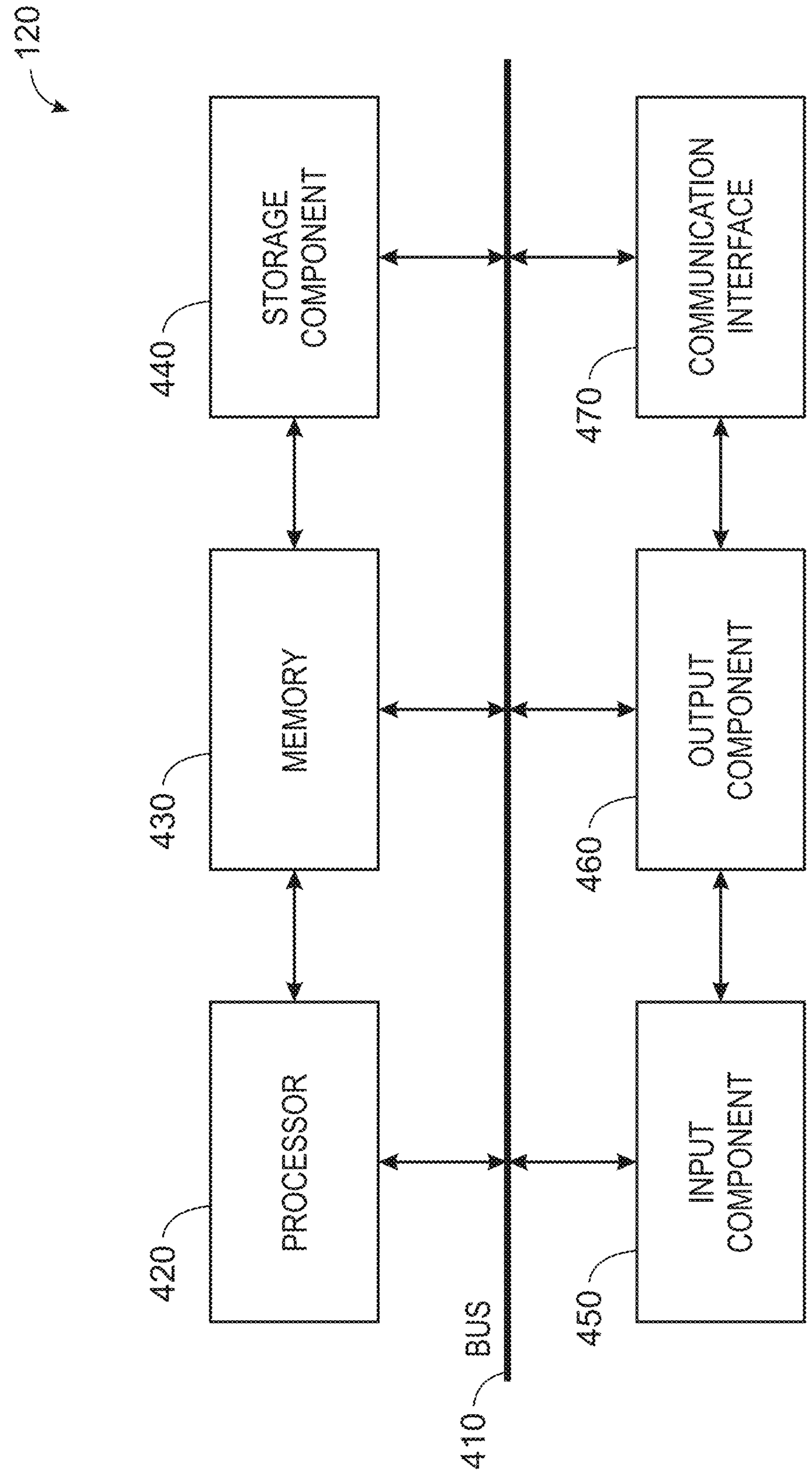
FIG. 4 is a diagram of components of an example platform for training a DDPM to generate corrected medical images.

FIG. 4 is a diagram of components of an example platform 120 for training a DDPM to generate corrected medical images. As shown in FIG. 4, the platform 120 may include a bus 410, a processor 420, a memory 430, a storage component 440, an input component 450, an output component 460, and a communication interface 470.

The bus 410 includes a component that permits communication among the components of the platform 120. The processor 420 may be implemented in hardware, firmware, or a combination of hardware and software. The processor 420 may be a CPU, a GPU, an APU, a microprocessor, a microcontroller, a DSP, an FPGA, an ASIC, or another type of processing component. The processor 420 may include one or more processors capable of being programmed to perform a function. The processor 420 may include one or more processors 420 configured to perform the operations described herein. For example, a single processor 420 may be configured to perform all of the operations described herein. Alternatively, multiple processors 420, collectively, may be configured to perform all of the operations described herein, and each of the multiple processors 420 may be configured to perform a subset of the operations descried herein. For example, a first processor 420 may perform a first subset of the operations described herein, a second processor 420 may be configured to perform a second subset of the operations described herein, etc.

The memory 430 may include a RAM, a ROM, and/or another type of dynamic or static storage device (e.g., a flash memory, a magnetic memory, and/or an optical memory) that stores information and/or instructions for use by the processor 420.

The storage component 440 may store information and/or software related to the operation and use of the platform 120. For example, the storage component 440 may include a hard disk (e.g., a magnetic disk, an optical disk, a magneto-optic disk, and/or a solid state disk), a CD, a DVD, a floppy disk, a cartridge, a magnetic tape, and/or another type of non-transitory computer-readable medium, along with a corresponding drive.

The input component 450 may include a component that permits the platform 120 to receive information, such as via user input (e.g., a touch screen display, a keyboard, a keypad, a mouse, a button, a switch, a camera, and/or a microphone). Additionally, or alternatively, the input component 450 may include a sensor for sensing information (e.g., a GPS component, an accelerometer, a gyroscope, and/or an actuator). The output component 460 may include a component that provides output information from the platform 120 (e.g., a display, a speaker for outputting sound at the output sound level, and/or one or more LEDs).

The communication interface 470 may include a transceiver-like component (e.g., a transceiver and/or a separate receiver and transmitter) that enables the platform 120 to communicate with other devices, such as via a wired connection, a wireless connection, or a combination of wired and wireless connections. The communication interface 470 may permit the platform 120 to receive information from another device and/or provide information to another device. For example, the communication interface 470 may include an Ethernet interface, an optical interface, a coaxial interface, an infrared interface, an RF interface, a USB interface, a Wi-Fi interface, a cellular network interface, or the like.

The platform 120 may perform one or more processes described herein. The platform 120 may perform these processes based on the processor 420 executing software instructions stored by a non-transitory computer-readable medium, such as the memory 430 and/or the storage component 440. A memory device may include memory space within a single physical storage device or memory space spread across multiple physical storage devices.

The software instructions may be read into the memory 430 and/or the storage component 440 from another computer-readable medium or from another device via the communication interface 470. When executed, the software instructions stored in the memory 430 and/or the storage component 440 may cause the processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of the components shown in FIG. 4 are provided as an example. In practice, the platform 120 may include additional components, fewer components, different components, or differently arranged components than those shown in FIG. 4. Additionally, or alternatively, a set of components (e.g., one or more components) of the platform 120 may perform one or more functions described as being performed by another set of components of the platform 120.

Figure 5:
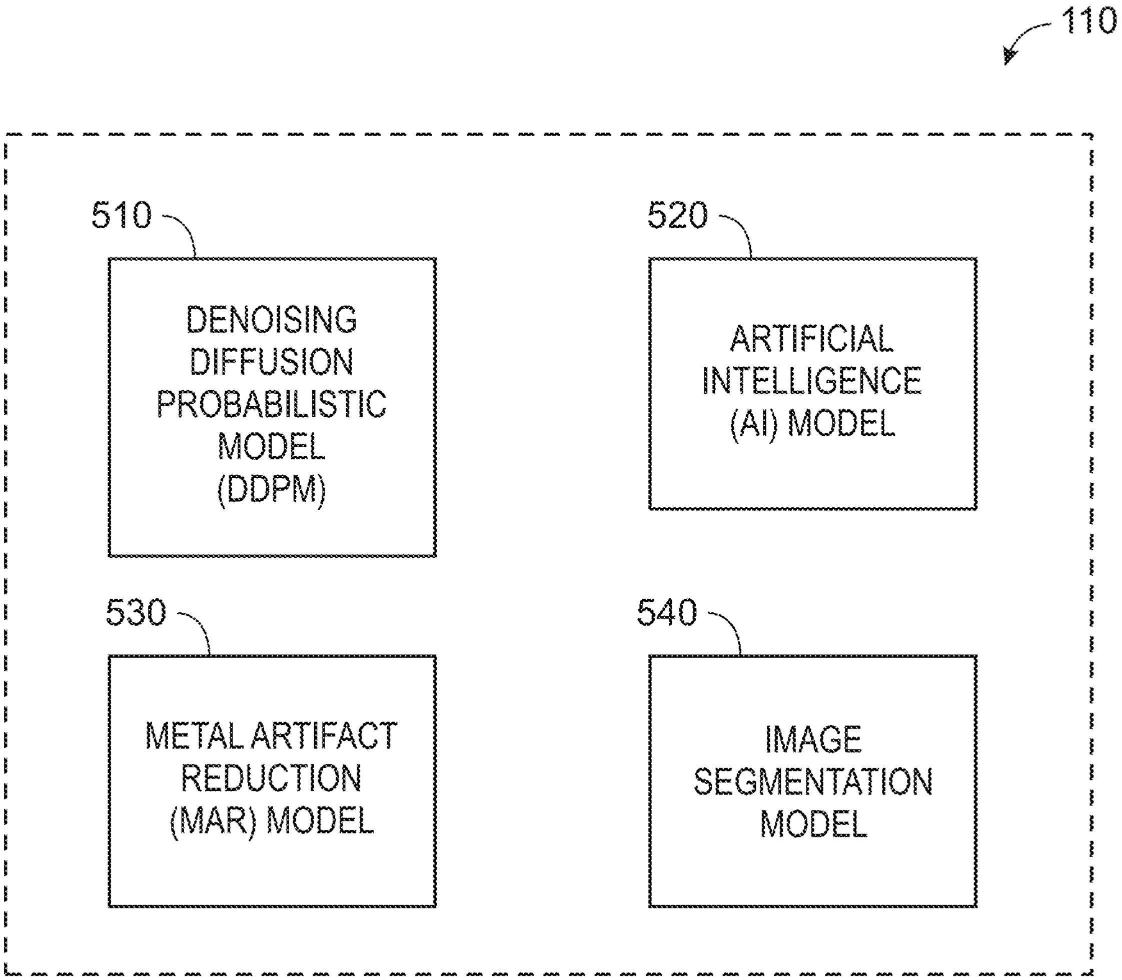
FIG. 5 is a diagram of models of an example imaging system for generating medical images.

FIG. 5 is a diagram of models of an example imaging system 110 for generating medical images. As shown in FIG. 5, the imaging system 110 may store, or have access to, a DDPM 510, an AI model 520, a MAR model 530, and/or an image segmentation model 540.

The DDPM 510 may be configured to acquire a corrupted sinogram, corresponding to a corrupted CT image, including a corrupted region of corrupted data caused by the metal object and an uncorrupted region of uncorrupted data, and acquire a mask sinogram that delineates the corrupted region of the corrupted data. The DDPM 510 may be configured to generate a corrected sinogram including the uncorrupted region of the uncorrupted data and an inpainted region of inpainted data corresponding to the corrupted region, based on the corrupted sinogram and the mask sinogram. For example, the DDPM 510 may be configured to remove the corrupted data from the corrupted region, and inpaint data in the corrupted region. The DDPM 510 may be configured to perform a forward diffusion process and a reverse diffusion process to iteratively generate sinograms according to a set of diffusion steps, as described in more detail in connection with FIGS. 11 and 12.

Other embodiments may replace the DDPM 510 by different generative AI methods that are closely related to the DDPM 510 or other score-matching methods, such as Poisson Flow Generative Models. For simplicity, the present disclosure may refer to DDPM 510 as a representative AI approach, with the understanding that the DDPM 510 may be replaced by a similar AI technique such as score-based models.

According to an embodiment, the AI model 520 may be a partial convolutional U-net model that is configured to generate a corrected sinogram by inpainting a corrupted region of a corrupted sinogram. In this case, the AI model 520 may include an encoder network including down-sampling layers, and a decoder network including decoding layers. The AI model 520 may acquire a corrupted sinogram ($S_C$) and a mask sinogram (M). The AI model 520 may use the mask sinogram to identify an uncorrupted region of uncorrupted data, and a corrupted region of corrupted data.

The AI model 520 may calculate a weighted sum of the uncorrupted data located in the uncorrupted region, and ignore the corrupted data in the corrupted region during a convolution operation. The AI model 520 may update the mask sinogram at each layer though convolutions of a same size and stride to match a dimension of the corrupted sinogram. The data of the mask sinogram may be set to "1" if the kernel spanned at least one uncorrupted pixel. The output of the last layer may be a generated sinogram having a same dimension as the corrupted sinogram. The corrupted region may include inpainted data. The AI model 520 may employ skip connections at various scales that concatenate the feature maps of the corrupted sinogram and the mask sinogram at each encoding stage with the respective feature maps at the decoding stage. The purpose of the skip-connections may be to propagate features from the same scale to each decoding layer, which facilitates learning of global and local contextual information. According to an embodiment, the AI model 520 may be trained using greater than 200,000 training steps with a batch size of 4, using the Adam optimizer with an initial learning rate of 0.0002. The AI model 520 may use the following loss function:

$$L = MAE_V + 6MAE_C + 0.05L_P + 120L_{style} + 0.1L_{TV}$$

As shown above, the terms "$MAE_V$" and "$MAE_C$" may denote the pixel-wise mean absolute error between the model generated sinogram ($S_G$) and ground truth metal-free ($S_{GT}$) sinograms in the uncorrupted and corrupted regions, respectively (i.e., pixels where the input mask is "1" and "0," respectively). "$L_P$" may represent the perceptual loss, which calculates the pixel-wise absolute difference between higher level feature maps of the inpainted sinogram ($S_{ip}$) and $S_{GT}$, where $S_{ip}$ is calculated by replacing $S_G$ with the values of $S_{GT}$ only in uncorrupted regions. The high-level feature maps may be derived by passing each sinogram through a pre-trained deep convolutional neural network model (e.g., VGG-16) on ImageNet weights. "$L_{style}$" may represent the style-loss, which may be the pixel-wise difference between the autocorrelation matrices of higher-level feature maps of $S_{ip}$ and $S_{GT}$. The high-level feature maps may be calculated similarly as in the case of the perception loss. "$L_{TV}$" may represent the total variation loss which penalizes local gradients and leads to smoother reconstructed sinograms.

According to another embodiment, the AI model 520 may be a GAN that is configured to generate a corrected sinogram by inpainting a corrupted region of a corrupted sinogram. In this case, the AI model 520 may include two successive networks that each have an encoder-decoder setting. The first network may be configured to acquire a corrupted sinogram ($S_C$) and a mask sinogram (M), and output an initial coarse prediction of a sinogram with plausible inpainted data in the corrupted region. The coarse prediction may then be passed through the second network, which further refines the predicted sinogram. The encoder-decoder configuration of the coarse and refinement networks may be similar to the configuration of the partial convolutional U-net model. However, the GAN might not utilize skip connections. Further, the convolutional layers might be replaced with gated convolutions. The gated convolution may be an extension of the partial convolution described above with respect to the partial convolutional U-net model. Partial convolution may apply more flexible gating at the output features of each convolutional layer based on a learnable weighted mask instead of directly applying a binary mask. The weighted mask may be equal to the mask sinogram (M) at the input layer. After each gated convolutional layer, the weighted mask sinogram may be updated by applying a standard learnable convolutional layer, followed by a sigmoid function, which forces its values within [0 1]. Each value in the mask sinogram may indicate the importance of the respective pixels at each feature map.

According to an embodiment, a spectral-normalized Markovian discriminator (SN-PatchGAN) may be used for adversarial training. The SN-PatchGAN may include a six-layer CNN with a kernel size of 5 and a stride of 2. The discriminator network may acquire, as an input, either $S_{GT}$ or $S_G$ and output a feature map of size H×W×D. A GAN with spectral normalization may be applied separately at each pixel of the feature map, which may optimize both the generator, Go, and discriminator, Do, based on whether the latter network correctly discriminated between $S_{GT}$ or $S_G$. The following Hinge loss function may be used as an objective function for both networks:

$$L_G = -E_{S_G}[D(G(S_C, M))]$$

$$L_D = E_{S_{GT}}[\mathrm{Re}LU(1 - D(S_{GT}))] + E_{S_G}[\mathrm{Re}LU(1 + D(G(S_{GT})))]$$

As shown above, "$E_{S_G}$" and "$E_G$" may be the expected values over all real and generated data instances. In addition, the generator may be optimized based on the mean square error (MSE) between the generated sinogram ($S_G$) and the ground truth sinogram ($S_{GT}$). According to an embodiment, the AI model 520 may be trained using greater than 200,000 training steps with a batch size of 4 and using the Adam optimizer with an initial learning rate of 0.0002.

The MAR model 530 may be a NMAR model that is configured to inpaint a corrupted region of a corrupted sinogram. The MAR model 530 may be configured to perform interpolation using a normalized sinogram to avoid, or reduce, discontinuities. The MAR model 530 may fit a linear segment in each projection row based on the adjacent uncorrupted regions that are not affected by the metal artifacts, and replace the corrupted data. To provide smoother transition from the interpolated values to the uncorrupted regions, the MAR model 530 may fit each linear segment to connect the average projection value of five consecutive projection numbers before and after the corrupted region.

The MAR model 530 may normalize the corrupted sinogram ($S_C$) via pixel-wise division with a prior sinogram ($S_P$) so that the projection values become relatively flat. Subsequently, the MAR model 530 may use linear interpolation to correct the corrupted region. The MAR model 530 may then denormalize the normalized interpolated sinogram via pixel-wise multiplication with the prior sinogram ($S_P$). The MAR model 530 may obtain the final corrected sinogram ($S_{NMAR}$) using the following formula:

$$S_{NMAR} = S_P \odot LI\left(S_c \odot \frac{1}{S_P}\right)$$

The MAR model 530 may perform back-projection of the linearly corrected sinogram ($S_{LI}$) to compute the prior sinogram. The MAR model 530 may generate a baseline MAR corrected CT image ($I_{LI}$). Subsequently, the MAR model 530 may threshold the correct CT image ($I_{LI}$) by setting pixels corresponding to regions of air and soft tissue to, as examples, −1000 Hounsfield unit (HU) and 0 HU, respectively. Bone regions may maintain their original values due to their high intensity variation. The MAR model 530 may perform forward projection on the resulting thresholded image, and generate $S_P$.

The image segmentation model 540 may be configured to segment a metal object included in a CT image, or configured to segment a corrupted region in a corrupted sinogram. For example, the image segmentation model 540 may be utilize edge detection segmentation, clustering-based segmentation, region-based segmentation, neural network-based segmentation, Bayesian-based segmentation, or the like. As particular examples, the image segmentation model 540 may be a U-net model, a Swim-Unet model, Segment Anything Model (SAM), or the like. The image segmentation model 540 may acquire a CT image depicting a metal object, segment the metal object, and generate a CT image including only the metal object. Alternatively, the image segmentation model 540 may acquire a corrupted sinogram including a corrupted region and an uncorrupted region, segment the corrupted region, and generate a segmented sinogram delineating the corrupted region.

Figure 6:
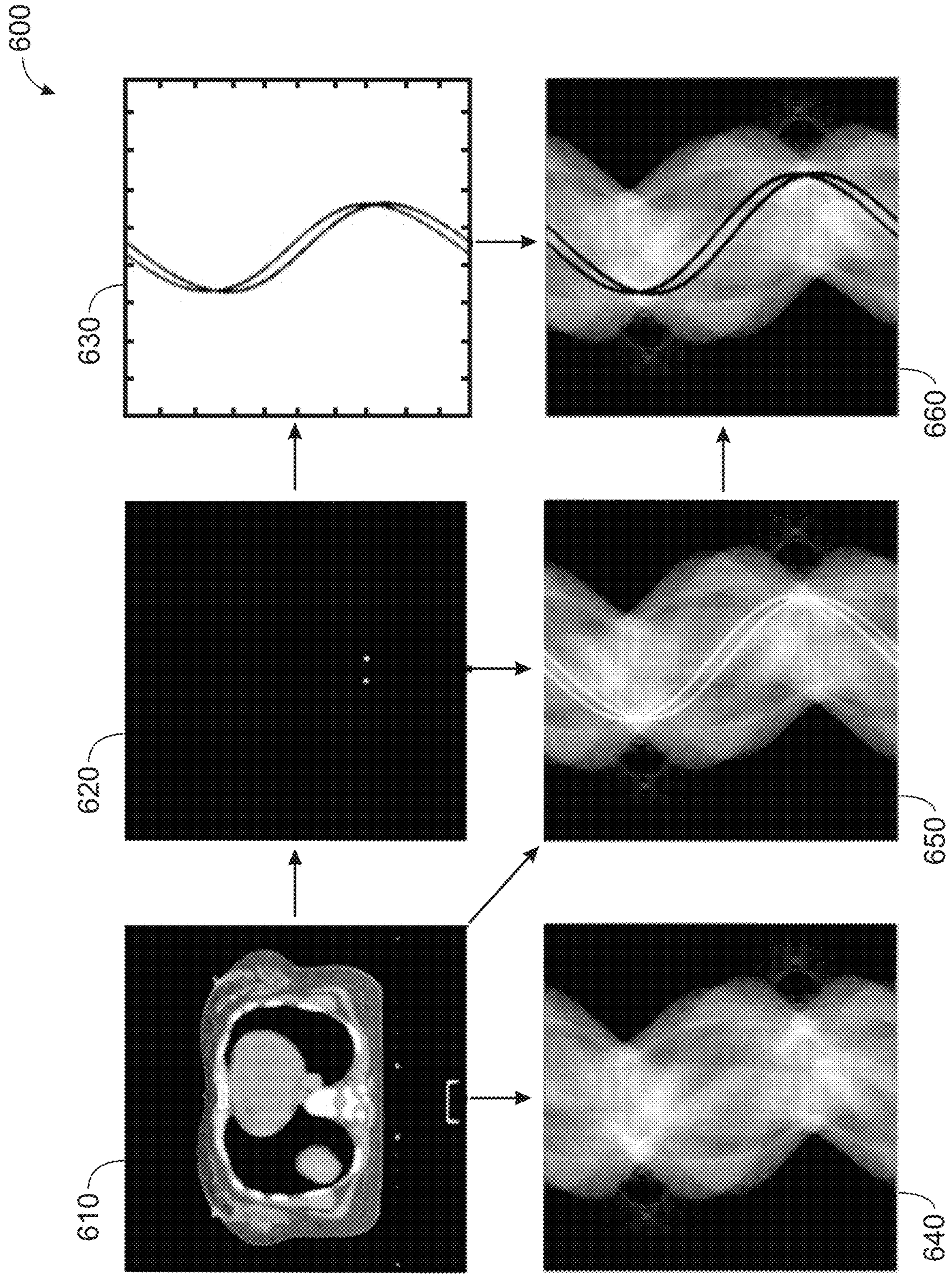
FIG. 6 is a diagram of training data for a model for generating medical images.

FIG. 6 is a diagram 600 of training data of a model for generating medical images. According to an embodiment, the platform 120 may acquire and/or generate training data for training the DDPM 510, the AI model 520, the MAR model 530, and/or the image segmentation model 540. The training data may include a CT image 610 that depicts anatomical features and that does not depict a metal object, a CT image 620 that does not depict anatomical features and that does depict a metal object, a mask sinogram 630 that corresponds to the CT image 620 of a metal object, an uncorrupted sinogram 640 that corresponds to the CT image 610 that depicts anatomical features and that does not depict a metal object, a corrupted sinogram 650 that corresponds to a combination of the CT image 610 and the CT image 620, and a sinogram 660 with a removed corrupted region as identified by the mask sinogram 630.

According to an embodiment, the platform 120 may generate the training data using a CT simulation model using real subject images that depict metal objects, and real subject images that do not depict metal objects. The platform 120 may use the mask sinogram to mask data in the shadow of the metal object. According to an embodiment, the platform 120 may configure the CT simulation model to use a nominal CT geometry with source-to-iso-distance of 540 millimeters (mm), source-to-detector distance of 950 mm, 1.0 mm×1.1 mm detector cells, detector quarter offset, 120 kilovoltage peak (kVp) tube voltage, 200 milliampere (mA) tube current, 2 detector rows, 888 detector columns, 984 views, a large bowtie filter, realistic quantum noise, electronic noise, and beam hardening.

According to an embodiment, the platform 120 may acquire CT images from datasets, such as the DeepLesion Dataset provided by the NIH, the University College London Hospitals (UCLH) Stroke electrical impedance tomography (EIT) dataset, or the like. The platform 120 may define random metal objects based on CT images of metal objects. The platform 120 may employ spatial transformations to vary the positions and sizes of the metal objects. Further, the platform 120 may apply morphological operators (e.g., opening, closing, erosion, dilation, or the like) to generate variations of the shapes of the metal objects. The platform 120 may generate images including one or more metal objects by randomly combining the generated metal objects. The platform 120 may generate a valid placement of a metal object by determining that the metal object overlaps with a threshold amount of a region having an HU value that exceeds a threshold. In this way, the platform 120 may prevent the metal object from being placed in air. According to an embodiment, the platform 120 may generate greater than 20,0000 corrupted sinograms using various combinations and permutations of subject images and metal objects.

In addition, and as a particular example, the platform 120 may generate four datasets for rigorous evaluation of clinically relevant image quality. The platform 120 may acquire four patient CT scans at the Massachusetts General Hospital (MGH) for prostate, spine, dental and hip regions, and generate realistic metal objects for each case (e.g., gold prostate markers, steel spinal cage, amalgam dental fillings, and a titanium hip replacement). The platform 120 may generate sinograms using the CT simulation model. The platform 120 may pad the sinograms to a dimension of 1024×1024. The platform 120 may use circular padding along the vertical axis, which exploits the periodic nature of CT sinograms. Further, the platform 120 may use zero padding along the horizontal axis.

The platform 120 may train the AI model 520 (e.g., a CNN, a GAN, or the like) with the corrupted sinograms ($S_C$) with missing traces (e.g., the sinogram 650), and the mask sinograms (M) (e.g., the mask sinogram 630) as inputs, and with the ground truth sinograms ($S_{GT}$) (e.g., the sinogram 610) without metal objects as the target. The platform 120 may train the DDPM 510 unconditionally with the ground truth sinograms ($S_{GT}$) as the target distribution, without using any information regarding $S_c$ or M. The platform 120 may reconstruct the corrected sinograms and re-insert metal objects in the image-domain.

Figure 8A:
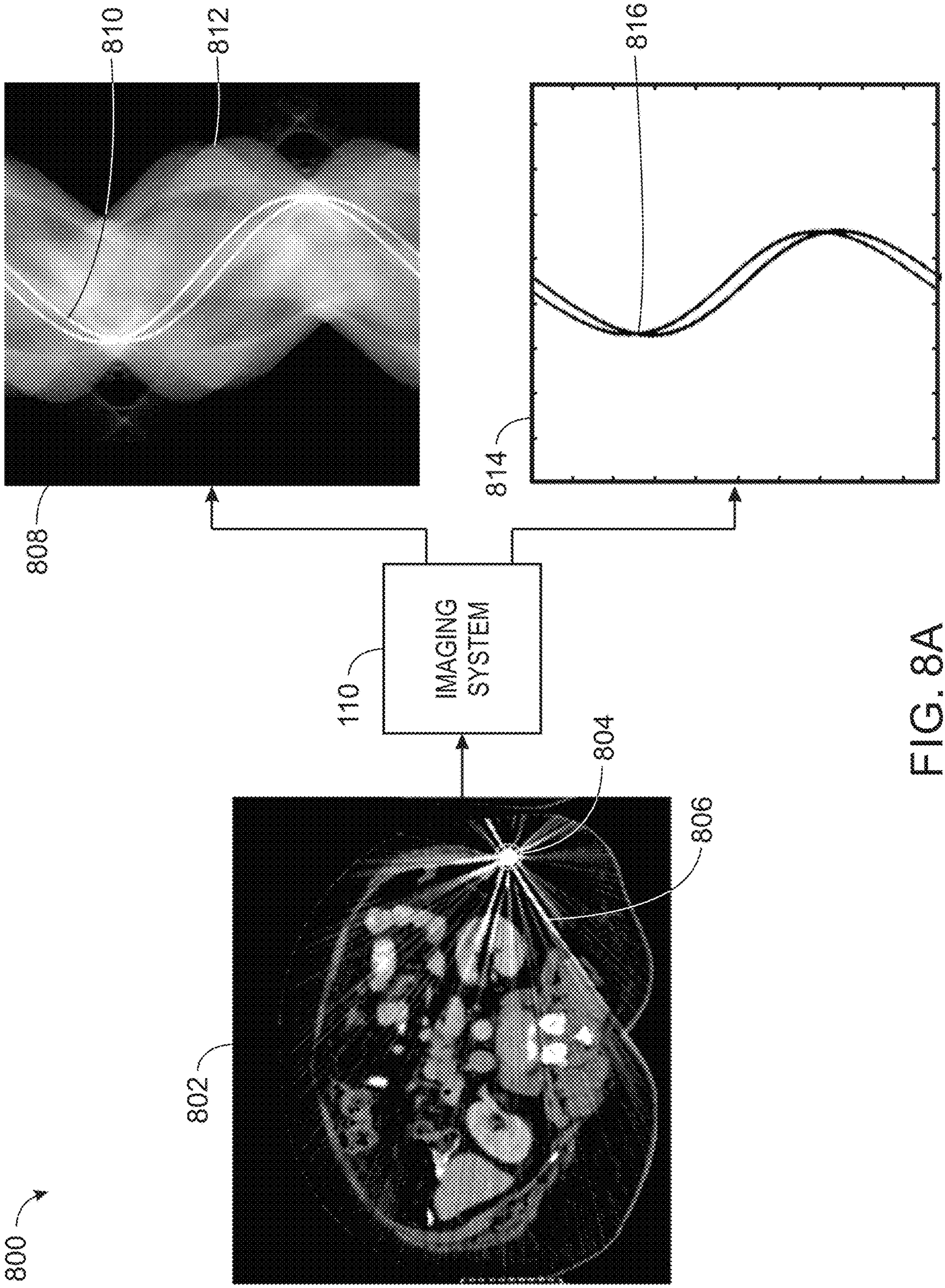
FIGS. 8A-8C are diagrams of an example process for MAR in CT images using a DDPM.
Figure 8B:
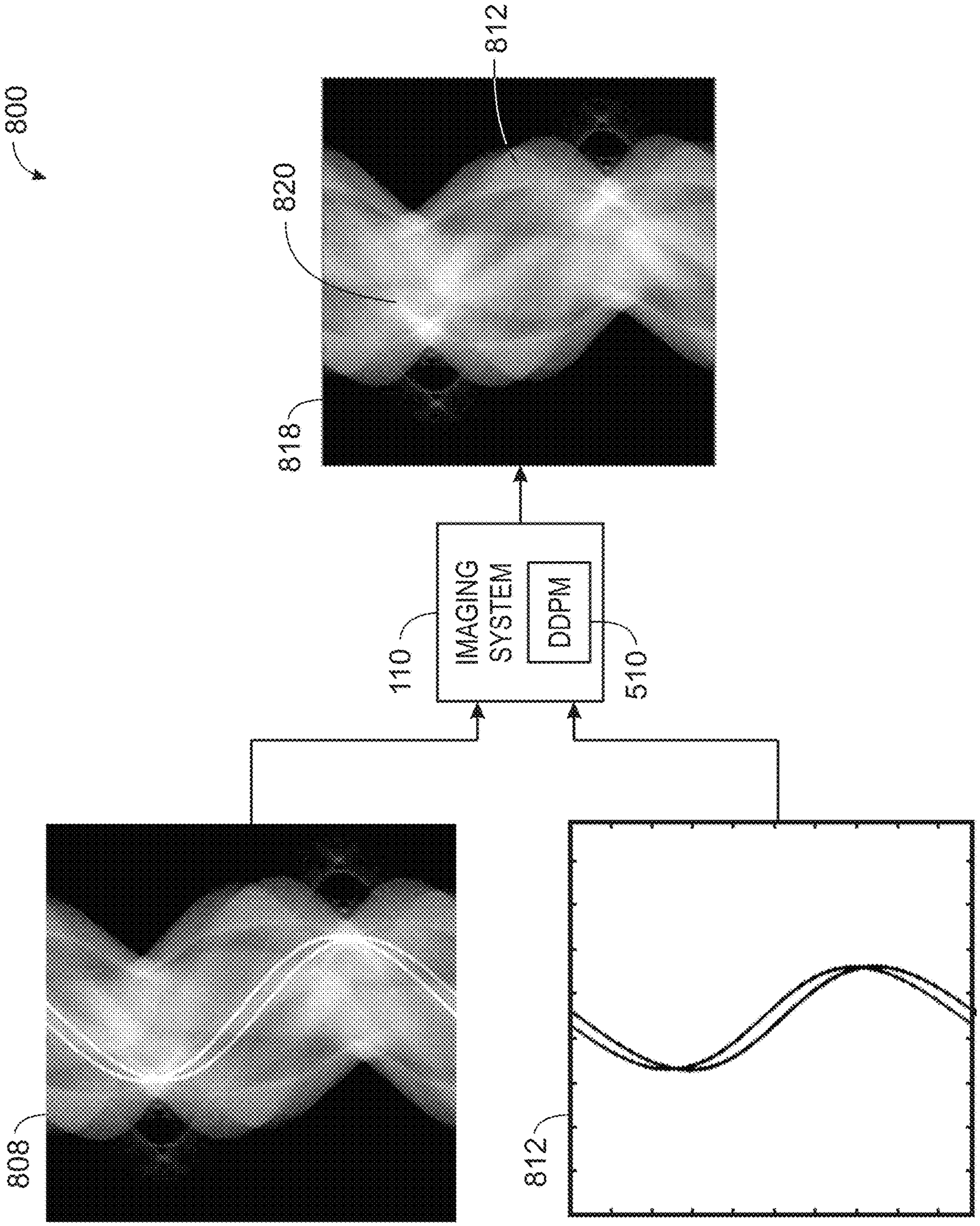
Figure 8C:
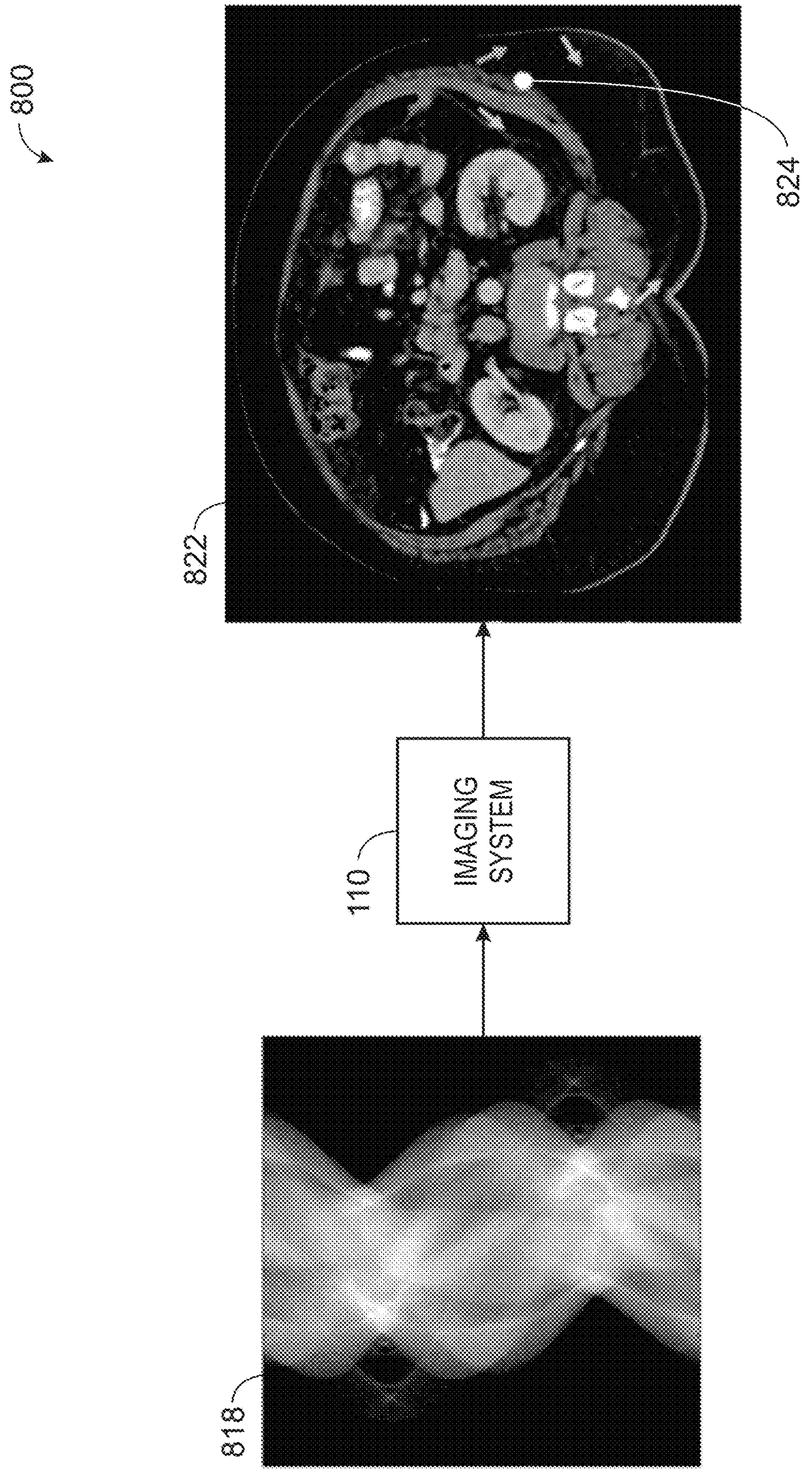

FIG. 7 is a flowchart of an example process 700 for MAR in CT images using the DDPM 510. According to an embodiment, the imaging system 110 may be configured to perform one or more operations of the process 700. Additionally, or alternatively, the platform 120 may be configured to perform one or more operations of the process 700. FIGS. 8A-8C are diagrams of an example process 800 for MAR in CT images using the DDPM 510.

As shown in FIG. 7, the process 700 may include acquiring a corrupted computed tomography (CT) image, of a region of interest (ROI) of a subject, including artifacts caused by a metal object in the subject (operation 710). For example, the imaging system 110 may perform a CT scan of an ROI of the subject, and acquire a corrupted CT image of an ROI of the subject. The corrupted CT image may be a 2D image, a 3D image, or the like. The corrupted CT image of the ROI may include artifacts caused by the inclusion of a metal object in the subject. For example, the artifacts may be dark and light bands that emanate from the metal object. As a particular example, and referring to FIG. 8A, the imaging system 110 may acquire a corrupted CT image 802 that includes a metal object 804 included in a subject, and artifacts 806 that emanate from the metal object 804. The metal object may be a dental filing, an orthopedic prosthesis, a stent, surgical hardware, or the like. The subject may be a human, an animal, a phantom, or the like. The ROI may be any region of the subject that may be imaged via the imaging system 110. For example, the ROI may be a head, a thorax, an abdomen, a pelvis, or the like.

As further shown in FIG. 7, the process 700 may include generating a corrupted sinogram including a corrupted region of corrupted data caused by the metal object and an uncorrupted region of uncorrupted data (operation 720). For example, the imaging system 110 may generate a corrupted sinogram associated with the corrupted CT image. The corrupted sinogram may include a corrupted region of corrupted data caused by the metal object, and an uncorrupted region of uncorrupted data that is not affected, or that is less affected, by the metal object. As a particular example, and referring to FIG. 8A, the imaging system 110 may generate a corrupted sinogram 808 that includes a corrupted region 810 of corrupted data, and an uncorrupted region 812 of uncorrupted data. The corrupted region may include corrupted pixels, corrupted voxels, or the like. The uncorrupted region may include uncorrupted pixels, uncorrupted voxels, or the like.

As further shown in FIG. 7, the process 700 may include generating a mask sinogram that delineates the corrupted region of the corrupted data (operation 730). For example, the imaging system 110 may generate a mask sinogram that delineates the corrupted region of the corrupted data of the corrupted sinogram. As a particular example, and referring to FIG. 8A, the imaging system 110 may generate a mask sinogram 814 that delineates the corrupted region 810 of the corrupted data via a mask 816.

According to an embodiment, the imaging system 110 may generate the mask sinogram based on segmenting the metal object in the corrupted CT image. For example, the imaging system 110 may segment the metal object in the CT image using the image segmentation model 540, and generate a CT image that only includes the metal object. The imaging system 110 may generate a mask sinogram associated with the CT image that only includes the metal object, and acquire the mask sinogram based on generating the mask sinogram. Alternatively, the imaging system 110 may generate the mask sinogram directly from a corrupted sinogram based on segmenting the corrupted region. For example, the imaging system 110 may generate the mask sinogram from the corrupted sinogram using a thresholding technique, a deep learning segmentation technique, or the like. Alternatively, the imaging system 110 may generate the mask sinogram using a first-pass reconstruction technique and image-domain segmentation and reprojection.

As further shown in FIG. 7, the process 700 may include generating a corrected sinogram including the uncorrupted region of the uncorrupted data and an inpainted region of inpainted data corresponding to the corrupted region, using a denoising diffusion probabilistic model, the corrupted sinogram, and the mask sinogram (operation 740). For example, the imaging system 110 may generate a corrected sinogram including the uncorrupted region of the uncorrupted data, and an inpainted region of inpainted data corresponding to the corrupted region. The imaging system 110 may generate the corrected sinogram using the DDPM 510, the corrupted sinogram, and the mask sinogram. As a particular example, and referring to FIG. 8B, the imaging system 110 may generate a corrected sinogram 818 that includes the uncorrupted region 812 of uncorrupted data, and an inpainted region 820 of inpainted data corresponding to the corrupted region 810 of corrupted data.

According to an embodiment, the imaging system 110 may input the corrupted sinogram and the mask sinogram into the DDPM 510, and acquire the corrected sinogram based on an output of the DDPM 510. The DDPM 510 may be trained to generate a corrected sinogram. For example, the DDPM 510 may be trained in accordance with a training process as described below in more detail in connection with FIG. 9. The DDPM 510 may be configured to generate a sinogram at a set of diffusion steps using a forward diffusion process and a reverse diffusion process. The DDPM 510 may remove the corrupted region of the corrupted data, and inpaint data to generate an inpainted region corresponding to the corrupted region. At each diffusion step, the DDPM 510 may iteratively generate a sinogram by combining the uncorrupted region of the uncorrupted data with an inpainted region of inpainted data. For example, the DDPM 510 may generate a corrected sinogram using a process as described in more detail in connection with FIG. 12.

As a particular example, and assuming a set of 1000 diffusion steps, the imaging system 110 may acquire an input corrupted sinogram including a corrupted region of corrupted data and an uncorrupted region of uncorrupted data. The imaging system 110 may generate a sinogram corresponding to the $1000^{th}$ diffusion step using a forward diffusion process, and remove the corrupted data of the corrupted region. The imaging system 110 may inpaint the corrupted region to generate a sinogram corresponding to the $1000^{th}$ diffusion step that includes inpainted data in the corrupted region, which may also be referred to as the inpainted region, and uncorrupted data in the uncorrupted region. The imaging system 110 may generate a first sinogram corresponding to the $999^{th}$ diffusion step using a reverse diffusion process and the sinogram corresponding to the $1000^{th}$ diffusion step. The imaging system 110 may generate a second sinogram corresponding to the $999^{th}$ diffusion step using the input corrupted sinogram and a forward diffusion process. The imaging system 110 may sample the inpainted data of the first sinogram from the inpainted region, sample the uncorrupted data of the second sinogram from the uncorrupted region, and generate a third sinogram corresponding to the $999^{th}$ diffusion step that includes the inpainted data and the uncorrupted data. Then, the imaging system 110 may proceed to the $998^{th}$ diffusion step. The imaging system 110 may generate a first sinogram corresponding to the $998^{th}$ diffusion step using the third sinogram corresponding to the $999^{th}$ diffusion step that includes the inpainted data and the uncorrupted data and a reverse diffusion process. The imaging system 110 may generate a second sinogram corresponding to the $998^{th}$ diffusion step using the input corrupted sinogram and a forward diffusion process. The imaging system 110 may sample the inpainted data of the first sinogram from the inpainted region, sample the uncorrupted data of the second sinogram from the uncorrupted region, and generate a third sinogram corresponding to the $998^{th}$ diffusion step that includes the inpainted data and the uncorrupted data. The imaging system 110 may iteratively repeat this process to generate the final corrected sinogram. In this way, the inpainted data corresponding to the corrupted region and the uncorrupted data corresponding to the uncorrupted region are progressively harmonized, which improves the coherency of the inpainted data and the uncorrupted data.

As further shown in FIG. 7, the process 700 may include generating a corrected CT image, of the ROI of the subject, that includes reduced artifacts relative to the artifacts in the corrupted CT image, based on the corrected sinogram (operation 750). For example, the imaging system 110 may generate a corrected CT image, of the ROI of the subject, that includes reduced artifacts relative to the artifacts in the corrupted CT image, based on the corrected sinogram. As a particular example, and referring to FIG. 8C, the imaging system 110 may generate a corrected CT image 822 that includes reduced artifacts 824 relative to the artifacts 806 included in the corrupted CT image 802.

As further shown in FIG. 7, the process 700 may include displaying the corrected CT image (operation 760). For example, the imaging system 110 may display the CT image via the display 216. Additionally, or alternatively, the imaging system 110 may transmit the corrected CT image to another device for display. Additionally, or alternatively, the imaging system 110 may transmit the corrected CT image to an application for utilization by the application. Additionally, or alternatively, the imaging system 110 may transmit the corrected CT image to a storage device for storage.

According to an embodiment, the imaging system 110 may use the DDPM 510 and an AI model 520 to generate a corrected CT image. For example, the imaging system 110 may generate multiple corrected CT images, and use the AI model 520 (e.g., a GAN discriminator) to select a particular corrected CT image. In this case, the DDPM 510 may be initialized with multiple noise realizations, and generate the multiple corrected CT images based on the initializations. The AI model 520 may select the optimal corrected CT image, a CT image having a quality metric that satisfies a threshold, or the like.

According to an embodiment, the imaging system 110 may use the DDPM 510 and the MAR model 530 to generate a corrected CT image. For example, the MAR model 530 (e.g., NMAR model) may generate a normalized CT image, and the DDPM 510 may use the normalized CT image to generate a corrected CT image.

According to an embodiment, the imaging system 110 may use the DDPM 510 and one or more MAR techniques to generate the corrected CT image. For example, the imaging system 110 may use the DDPM 510 and an image-domain MAR technique to generate the corrected CT image. That is, the imaging system 110 may use the DDPM 510 to generate a corrected CT image, and may use an image-domain MAR technique to further correct the corrected CT image. Alternatively, the imaging system 110 may generate the corrected sinogram by adjusting statistical weights in the mask sinogram. Alternatively, the imaging system 110 may generate a corrected sinogram using physics-based corrections for scatter, beam hardening, and noise.

Although FIG. 7 depicts particular operations and a particular sequence of operations, it should be understood that other embodiments may include different operations and/or differently arranged operations than as shown in FIG. 7.

Figure 9:
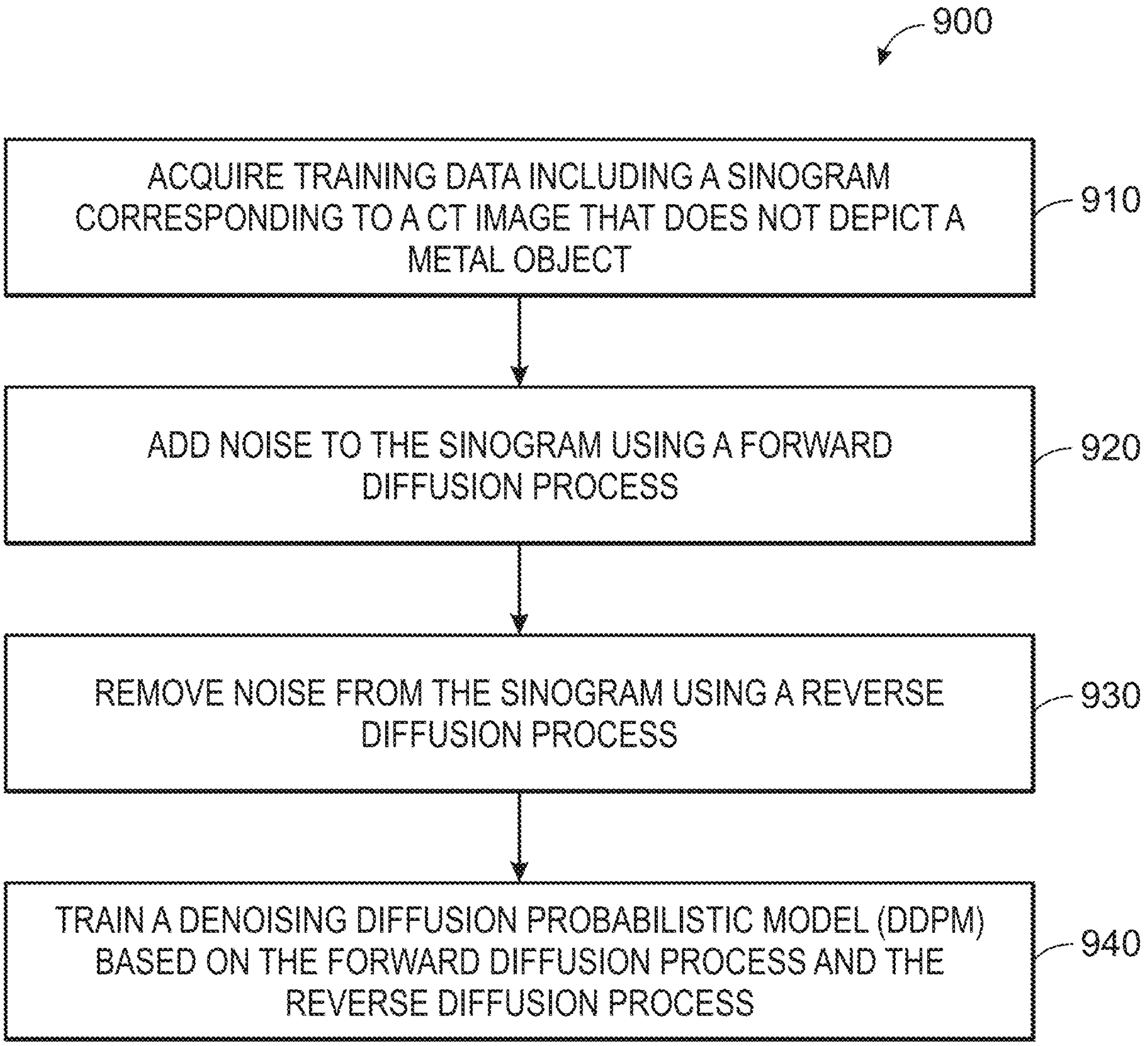
FIG. 9 is a flowchart of an example process for training a DDPM to generate a corrected sinogram.
Figure 10:
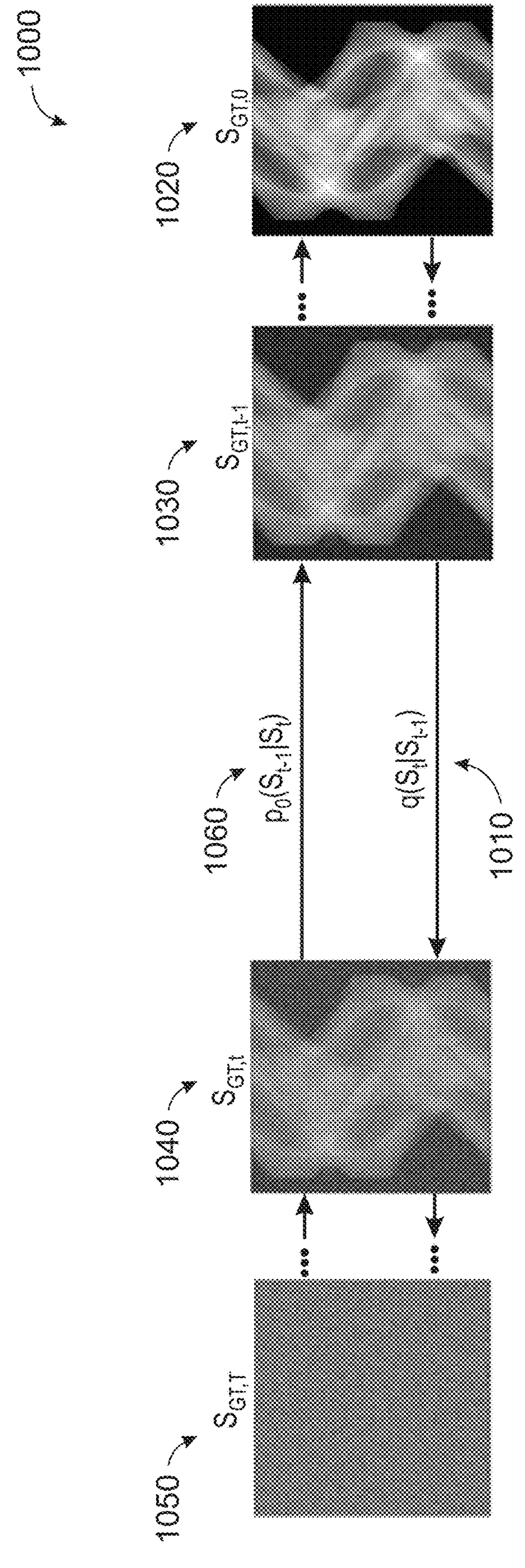
FIG. 10 is a diagram of an example process for training a DDPM to generate a corrected sinogram.

FIG. 9 is a flowchart of an example process 900 for training the DDPM 510 to generate a corrected sinogram. According to an embodiment, the platform 120 may be configured to perform one or more operations of the process 900. Additionally, or alternatively, the imaging system 110 may be configured to perform one or more operations of the process 900. FIG. 10 is a diagram of an example process 1000 for training the DDPM 510 to generate a corrected sinogram.

As shown in FIG. 9, the process 900 may include acquiring training data including a sinogram corresponding to a CT image that does not depict a metal object (operation 910). For example, the platform 120 may acquire a training data set of sinograms corresponding to respective CT images that do not depict metal objects. Each of the CT images might not depict a metal object. In this way, the platform 120 may train the DDPM 510 in an unconditional manner without any prior information regarding metal objects. In other words, the DDPM 510 might be trained using only CT images that do not depict metal objects. Further, in this way, the platform 120 may train the DDPM 510 to be non-reliant on a metal distribution in the training data, which provides a more generalizable DDPM 510 across different metal positons, geometries, or the like. The training data may be referred to as "training CT images," training sinograms," or the like.

As further shown in FIG. 9, the process 900 may include adding noise to the sinogram in a forward diffusion process (operation 920). For example, the platform 120 may run a forward diffusion process "q" in which a ground truth sinogram ($S_{GT}=S_{GT,0}$) is subjected to the addition of Gaussian noise "ε" at multiple time steps t∈ [0 T], and is eventually transformed to Gaussian white noise "$S_{GT,T}$." As a particular example, and referring to FIG. 10, the platform 120 may run the forward diffusion process "q" as shown by reference number 1010 to add noise to an initial sinogram 1020 ("$S_{GT,0}$") to generate a sinogram 1030 ("$S_{GT,T-1}$"), a sinogram 1040 ("$S_{GT,t}$"), and a sinogram 1050 ("$S_{GT,T}$"). At each time step "t," the distribution of noise injected to "$S_{GT,t}$," given the previous noising step "$S_{GT,t-1}$," may be defined as:

$$q(S_{GT,t} \mid S_{GT,t-1}) = N\left(S_{GT,t};\ \sqrt{1-\beta_t}\, S_{GT,t-1},\ \beta_t I\right)$$

As shown above, "N( )" may represent a Gaussian noise function, and "βt∈(0 1)" may be the variance of the noise model at time-step "t."

By considering noise addition at different time steps as independent events, the forward diffusion process at a given step may be expressed in relation to the initial input "$S_{GT,0}$" as follows:

$$q(S_{GT,t} \mid S_{GT,0}) = N\left(S_{GT,t};\ \sqrt{\overline{\alpha}_t}\, S_{GT,0},\ (1-\overline{\alpha}_t)I\right)$$

$$\overline{\alpha}_t = \prod_{i=1}^{t}(1-\beta_i)$$

As further shown in FIG. 9, the process 900 may include removing noise from the sinogram in a reverse diffusion process (930). For example, the platform 120 may run a reverse diffusion process "pθ" in which the DDPM 510 starts from $S_{GT,T}$, and iteratively reverses the noising that was performed in the forward diffusion process to derive $S_{GT,0}$. The goal may be to determine the reverse distribution "$q(S_{GT,t-1}|S_{GT,t})$" at each time step "t." The reverse distribution may be provided by a deep learning model which approximates the mean "$\mu_\theta(S_{GT,t}, t)$"and variance" $\Sigma_\theta(S_{GT,t}, t)$" of a Gaussian distribution, as follows:

$$p(S_{GT,t-1} \mid S_{GT,t}) = N\left(S_{GT,t-1};\ \mu_\theta(S_{GT,t}, t),\ \textstyle\sum_\theta(S_{GT,t}, t)\right)$$

The platform 120 may obtain the mean "$\mu_\theta(S_{GT,t}, t)$" by predicting the additive noise "$\varepsilon_\theta(S_{GT,t}, t)$" and using the following parameterization:

$$\mu_\theta(S_{GT,t}, t) = \frac{1}{\sqrt{\overline{\alpha}_t}}\left(S_{GT,t} - \frac{\beta_t}{\sqrt{1-\overline{\alpha}_t}}\varepsilon_\theta(S_{GT,t}, t)\right)$$

The DDPM 510 may output a vector "v" through which the variance is derived using the following:

$$\textstyle\sum_\theta(S_{GT,t}, t) = \exp\left(v\log(\beta_t) - (1-v)\log(\overline{\beta}_t)\right)$$

$$\overline{\beta}_t = \frac{1-\overline{\alpha}}{1-\overline{\alpha}_t}\beta_t$$

As further shown in FIG. 9, the process 900 may include training a denoising diffusion probabilistic model (DDPM)

based on the forward diffusion process and the reverse diffusion process (operation 940).

The combination of the forward and reverse diffusion processes constitutes a variational autoencoder (VAE) which may be trained by the platform 120 to learn both "$\mu_\theta(S_{GT,t}, t)$" and "$\Sigma_\theta(S_{GT,t}, t)$" by optimizing two objective functions of "$L_\mu$" and "$L_{vlb}$." "$L_\mu$" may be the expected value of the mean squared error between "$\varepsilon$" and "$\varepsilon_\theta(S_{GT,t}, t)$," and may be represented as:

$$L_\mu = E\left[\|\varepsilon - (S_{GT,t}t)\|^2\right]$$

The term "$L_{vlb}$" may represent the variational lower bound of the VAE and may be derived as:

$$L_{vlb} = L_0 + L_1 + \ldots + L_{T-1} + L_T$$

$$L_{vlb} = \begin{cases} -\log p_\theta(x_0 \mid x_1), & t = 0 \\ D_{KL}(q(x_{t-1} \mid x_t, x_0) \| p_\theta(x_{t-1} \mid x_t)), & 0 < t < T \\ D_{KL}(q(x_T \mid x_0) \| p(x_T)), & x \geq 0 \end{cases}$$

As shown above, the term "$D_{KL}$" may represent the optimization of the Kullback-Leibler divergence between the Gaussian distribution of consecutive denoising processes. The terms "$L_\mu$" and "$L_{vlb}$" may be combined to form a hybrid loss function as follows:

$$L_{hybrid} = L_\mu + \lambda L_{vlb}$$

As shown above, the term "$\lambda$" may be a weighting factor, and may be set equal to 0.001 according to an embodiment.

The platform 120 may use a U-net model for training the DDPM 510. According to an embodiment, the U-net model may include seven encoding and seven decoding layers. Each encoding layer may be connected to a respective decoding layer through skip-connections.

The platform 120 may use a BigGAN residual block for up-sampling and down-sampling the feature maps at each stage. The platform 120 may use self-attention modules at the 16×16 and 8×8 resolutions with a four attention heads. In addition, the time step may be incorporated into an embedding which may be used to control each residual block according to the corresponding diffusion step. According to an embodiment, the platform 120 may train the DDPM 510 using a batch size of 4, N=1000 diffusion steps, and the mean square error (MSE) as a loss function, for a total of 200,000 iterations.

In this way, the platform 120 may train the DDPM 510 to generate sinograms that match a distribution of a training dataset by learning the reverse of a diffusion process. The platform 120 may train the DDPM 510 to generate realistic sinograms. Subsequently, the imaging system 110 may condition the trained DDPM 510 using a mask sinogram to inpaint corrupted data in a corrupted region with plausible content. The diffusion process may be a Markov chain method that gradually injects noise into the data of the objective distribution. The platform 120 may train the DDPM 510 by running the forward diffusion process and the reverse diffusion process.

Figure 11:
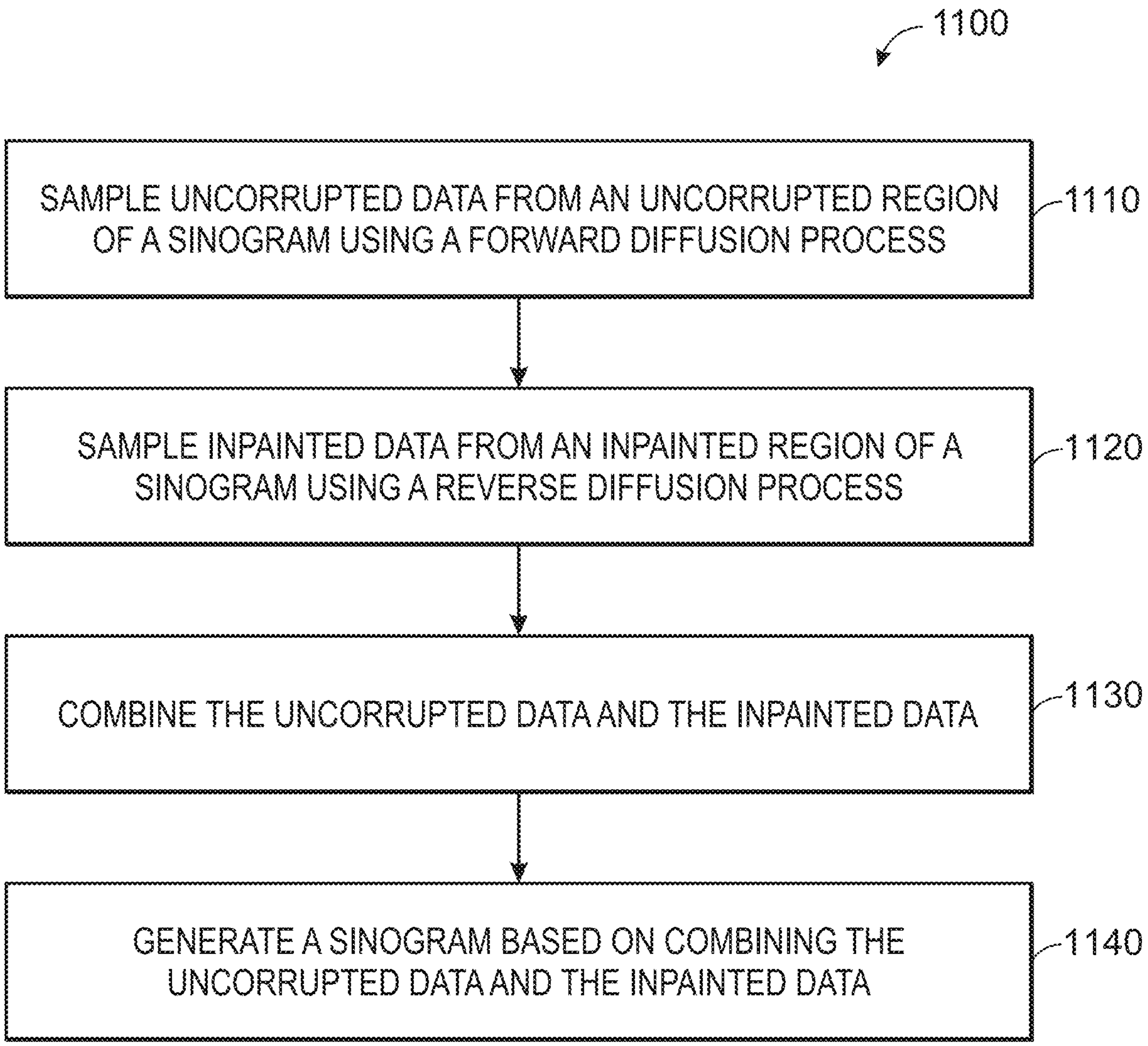
FIG. 11 is a flowchart of an example process for using a DDPM to generate a corrected sinogram.
Figure 12:
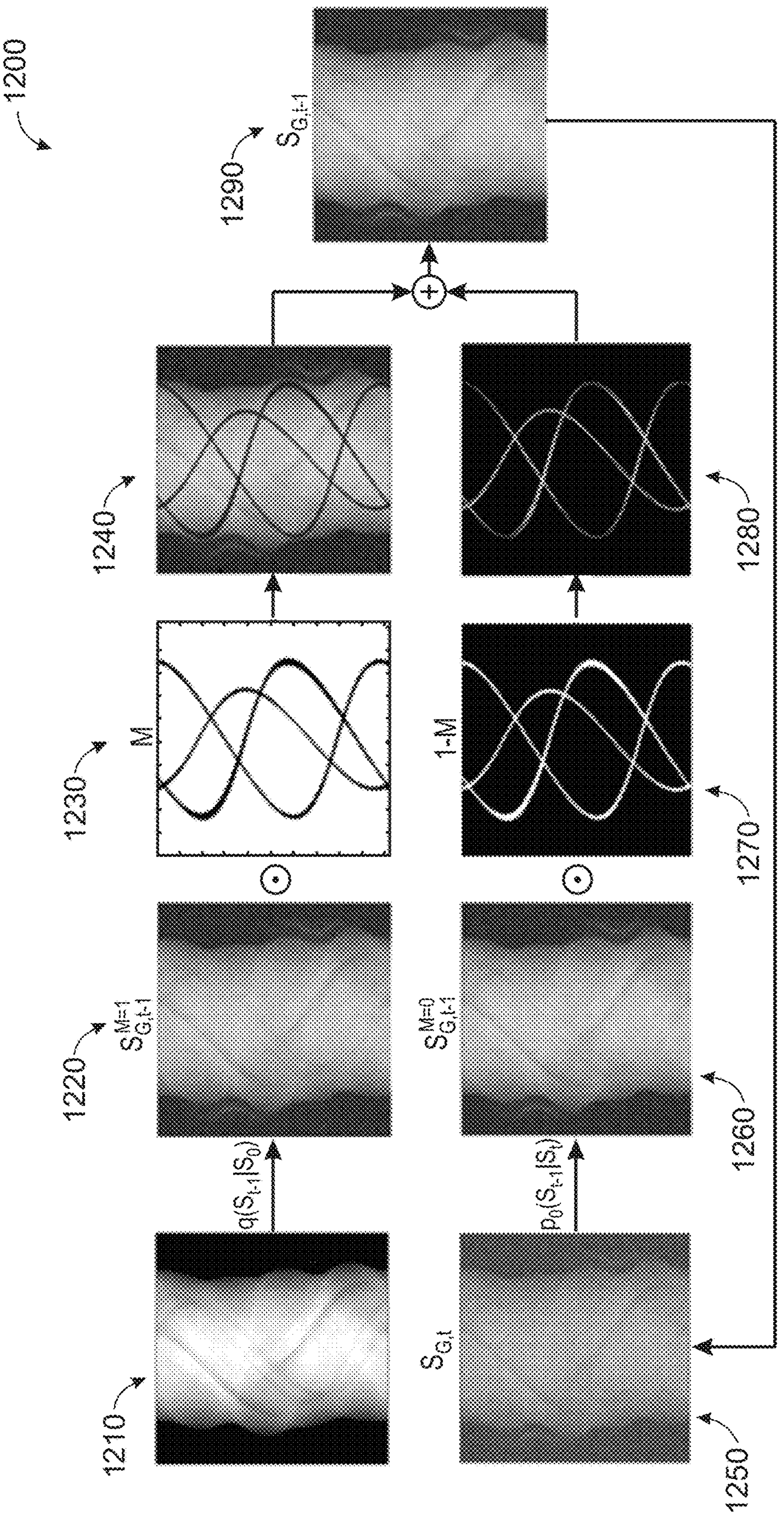
FIG. 12 is a diagram of an example process for using a DDPM to generate a corrected sinogram.

FIG. 11 is a flowchart of an example process 1100 for using a DDPM 510 to generate a corrected sinogram. According to an embodiment, the imaging system 110 may be configured to perform one or more operations of the process 1100. Additionally, or alternatively, the platform 120 may be configured to perform one or more operations of the process 1100. FIG. 12 is a diagram of an example process 1200 for using a DDPM 510 to generate a corrected sinogram.

As shown in FIG. 11, the process 1100 may include sampling uncorrupted data from an uncorrupted region of a sinogram using a forward diffusion process (operation 1110). For example, the imaging system 110 may use the DDPM 510 to sample uncorrupted data from an uncorrupted region of a sinogram using a forward diffusion process. At each diffusion step "t," the imaging system 110 may generate a sinogram "$S_{G,t}$." The imaging system 110 may use the DDPM 510 to add noise to a sinogram using the forward diffusion process:

$$S_{G,t-1}^{M=1} \sim N\left(\sqrt{\overline{\alpha_t}}\, S_{GT,0}, (1 - \overline{\alpha_t})I\right)$$

As a particular example, and referring to reference number 1210 of FIG. 12, the imaging system 110 may acquire a sinogram. Further, as shown by reference number 1220, the imaging system 110 may generate a sinogram "$S_{G,t-1}$" using the forward diffusion process "q." Further, as shown by reference numbers 1230 and 1240, the imaging system 1210 may sample uncorrupted data where values of a sinogram mask are equal to "1."

As further shown in FIG. 11, the process 1100 may include sampling inpainted data from an inpainted region of a sinogram using a reverse diffusion process (operation 1120). For example, the imaging system 110 may use the DDPM 510 to sample inpainted data from an inpainted region using a reverse diffusion process. At each diffusion step "t," the imaging system 110 may use the DDPM 510 to sample inpainted data corresponding to an inpainted region, that corresponds to an underlying corrupted region of an input corrupted sinogram, using the reverse diffusion process:

$$S_{G,t-1}^{M=0} \sim N\left(\mu_\theta(S_{G,t}, t), \sum\nolimits_\theta (S_{G,t}, t)\right)$$

As a particular example, and referring to reference number 1250 of FIG. 12, the imaging system 110 may acquire a sinogram "$S_{G,t}$." Further, as shown by reference number 1260, the imaging system 110 may generate a sinogram "$S_{G,t-1}$" using the reverse diffusion process "pθ." Further, as shown by reference numbers 1270 and 1280, the imaging system 110 may sample inpainted data where values of a sinogram mask are equal to "0."

As further shown in FIG. 11, the process 1100 may include combining the uncorrupted data and the inpainted data (operation 1130), and generating a sinogram based on combining the uncorrupted data and the inpainted data (operation 1140). For example, the imaging system 110 may generate a sinogram based on combining the uncorrupted data from the uncorrupted region with the inpainted data from the inpainted region that corresponds to an underlying corrupted region of an input corrupted sinogram. As a particular example, and referring to FIG. 12, the imaging system 110 may combine $$S_{G,t-1}^{M=1}$$

and $$S_{G,t-1}^{M=0}$$

as follows:

$$S_{G,t-1} = S_{G,t-1}^{M=1} \odot M + S_{G,t-1}^{M=0} \odot (1 - M)$$

According to an embodiment, the imaging system 110 may iteratively repeat the foregoing process for a set of diffusion steps "t" (e.g., t=250, t=300, t=1000, or the like) until a final sinogram is generated.

According to an embodiment, the imaging system 110 may use a resampling scheme to ensure, or provide, consistency between the uncorrupted data and the inpainted data. At a particular diffusion step "t," the imaging system 110 may subject a sinogram $S_{G,t-1}$ to a forward diffusion step to obtain a new $\widetilde{S_{G,t}}$ as follows:

$$\widetilde{S_{G,t}} \sim N\left(\sqrt{1-\beta_t}\, S_{G,t-1}, \beta_t I\right)$$

The imaging system 110 may resample the uncorrupted data and the inpainted data to generate a new $\tilde{S}_{G,t-1}$. The imaging system 110 may iteratively perform the foregoing process at multiple resampling steps "r" (e.g., r=10, r=20, r=50, or the like). In this way, the imaging system 110 may generate $$S_{G,t-1}^{M=0}$$

that is conditioned on data originating from the original sinogram, therefore harmonizing the data with $$S_{G,t-1}^{M=1}.$$

The imaging system 110 may use the resampling process at multiple time steps with a particular jump value "j" (e.g., j=10, j=20, j=50, or the like).

Figure 13:
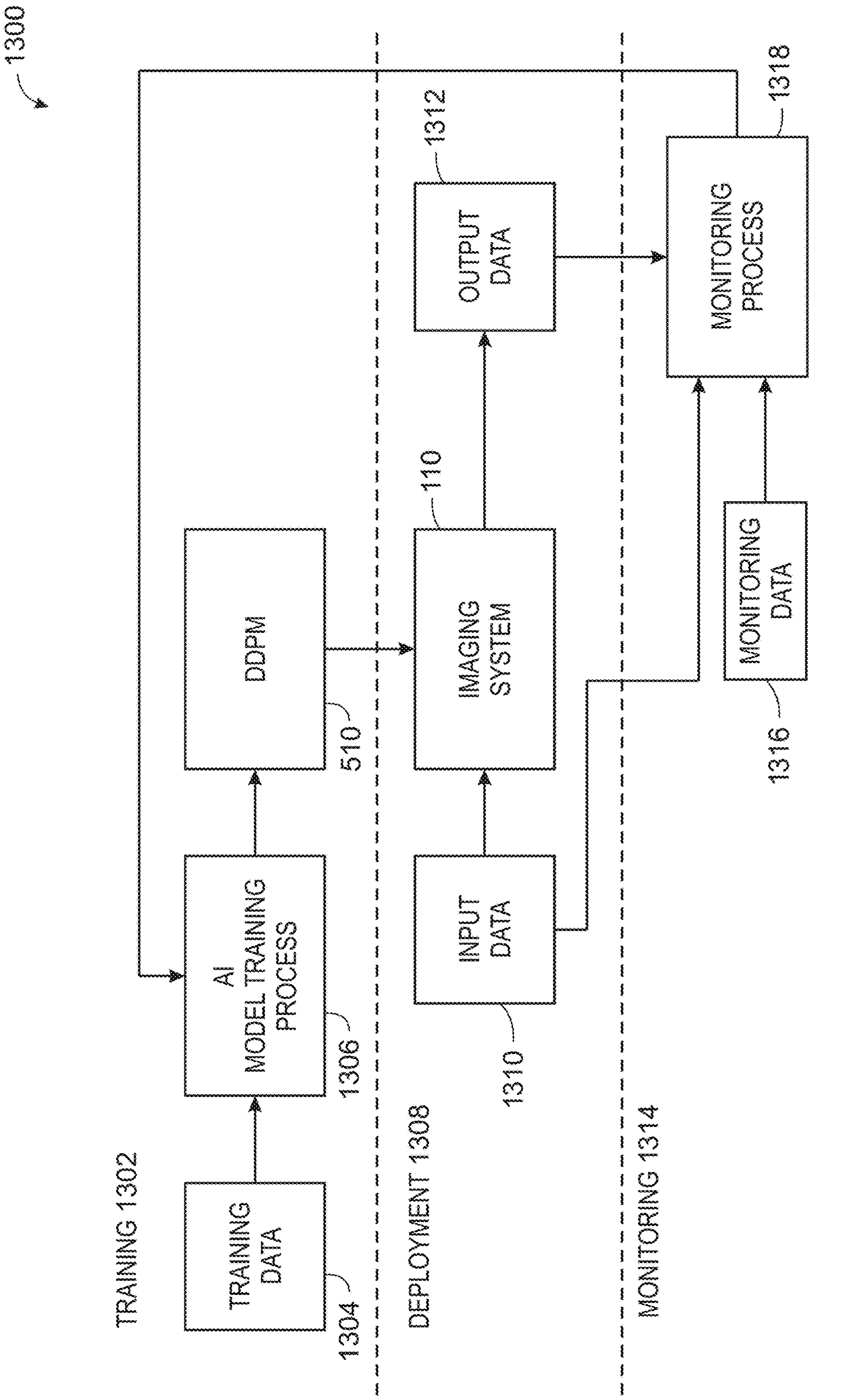
FIG. 13 is a diagram of an example process for training, deploying, and updating a DDPM.

FIG. 13 is a diagram of an example process 1300 for training, deploying, and updating the DDPM 510. The imaging system 110 and/or the platform 120 may generate, store, train, and/or use the DDPM 510. According to an embodiment, the imaging system 110 may include the DDPM 510 and/or instructions associated with the DDPM 510. For example, the imaging system 110 may include instructions for generating the DDPM 510, training the DDPM 510, using the DDPM 510, etc. According to an embodiment, the platform 120, or another device, may be used to generate and/or train the DDPM 510. For example, the platform 120, or another device, may include instructions for generating the DDPM 510, and/or instructions for training the DDPM 510. The platform 120 may provide a resulting trained DDPM 510 to the imaging system 110 for use.

As shown in FIG. 13, according to an embodiment, the process 1300 may include a training phase 1302, a deployment phase 1308, and a monitoring phase 1314. In the training phase 1302, at operation 1306, the process 1300 may include receiving and processing training data 1304 to generate a trained DDPM 510. The training data 1304 may be generated, received, or otherwise obtained from internal and/or external resources.

Generally, the DDPM 510 may include a set of variables (e.g., nodes, neurons, filters, or the like) that are tuned (e.g., weighted, biased, or the like) to different values via the application of the training data 1204. According to an embodiment, the training process at operation 1306 may employ supervised, unsupervised, semi-supervised, and/or reinforcement learning processes to train the DDPM 510. According to an embodiment, a portion of the training data 1304 may be withheld during training and/or used to validate the trained DDPM 510.

For supervised learning processes, the training data 1304 may include labels or scores that may facilitate the training process by providing a ground truth. For example, the labels or scores may indicate an output of the DDPM 510. Training may proceed by feeding a training dataset including the training data 1204 into the DDPM 510. The DDPM 510 may have variables set at initialized values (e.g., at random, based on Gaussian noise, based on pre-trained values, or the like). The DDPM 510 may generate an output based on the training dataset being input to the DDPM 510. The output may be compared with the corresponding label or score (e.g., the ground truth) indicating the known output, which may then be back-propagated through the DDPM 510 to adjust the values of the variables. This process may be repeated for a plurality of samples at least until a determined loss or error is below a predefined threshold. According to an embodiment, some of the training data 1204 may be withheld and used to further validate or test the trained DDPM 510.

For unsupervised learning processes, the training data 1304 may not include pre-assigned labels or scores to aid the learning process. Instead, unsupervised learning processes may include clustering, classification, or the like, to identify naturally occurring patterns in the training data 1304. As an example, the training data may be clustered into groups based on identified similarities and/or patterns. K-means clustering or K-Nearest Neighbors may also be used, which may be supervised or unsupervised. Combinations of K-Nearest Neighbors and an unsupervised cluster technique may also be used. For semi-supervised learning, a combination of training data 1304 with pre-assigned labels or scores and training data 1304 without pre-assigned labels or scores may be used to train the DDPM 510.

When reinforcement learning is employed, an agent (e.g., an algorithm) may be trained to make a decision from the training data 1304 through trial and error. For example, based on making a decision, the agent may then receive feedback (e.g., a positive reward if the prediction was above a predetermined threshold), adjust its next decision to maximize the reward, and repeat until a loss function is optimized.

After being trained, the trained DDPM 510 may be stored and subsequently applied by the imaging system 110 during the deployment phase 1308. For example, during the deployment phase 1308, the trained DDPM 510 executed by the imaging system 110 may receive input data 1310. During the deployment phase 1308, the trained DDPM 510 may perform one or more operations as described in connection with FIG. 9.

After being deployed, the trained DDPM 510 may be monitored during the monitoring phase 1314. For example, during the monitoring phase 1314, the DDPM 510 may generate monitoring data 1316 that is used to monitor the trained DDPM 510. The monitoring data 1316 may include data that identifies an output as determined by an operator. During process 1318, the monitoring data 1316 may be analyzed along with the predicted output data 1312 and input data 1310 to determine an accuracy of the trained DDPM 510. According to an embodiment, based on the analysis, the process 1300 may return to the training phase 1302, where at operation 1306 values of one or more variables of the model may be adjusted to improve the accuracy of the DDPM 510.

The example process 1300 described above is provided merely as an example, and may include additional, fewer, different, or differently arranged aspects than depicted in FIG. 13.

FIG. 13 describes the training, deployment, and monitoring associated with a trained DDPM 510. According to an embodiment, one or more other trained DDPM 510s may be applied. Each of the trained DDPM 510s may include similar training, deployment, and/or monitoring phases as described above for the trained DDPM 510 in FIG. 13, however the particular types of training data, input data, output data, and monitoring data may be different.

The generated sinogram ($S_G$) resulting from each of the DDPM 510, the AI model 520, and the MAR model 530 was cropped at the padded regions to convert the generated sinogram to the original sinogram dimension of 888×894. The final corrected sinograms included the values of the ground truth sinogram ($S_{GT}$) at uncorrupted pixels where M=1, and the values of $S_G$ where M=0. To avoid potential discontinuities between $S_{GT}$ and $S_G$, a linear rescaling process was carried out to adjust the intensity of the generated sinogram segment at each detector row, so that it matches the intensity of $S_{GT}$ at the interfaces between the uncorrupted and corrupted regions.

The ground truth, corrupted, and final corrected sinograms were reconstructed with filtered back-projection. Finally, an estimate of the metal object was added, by thresholding the uncorrected image and defining all voxels above the threshold as metal voxels.

All approaches were evaluated by quantifying the similarity between the MAR corrected and ground truth CT images in the test dataset, in terms of structural similarity index (SSIM), peak signal-to-noise ratio (PSNR), and root mean square error (RMSE). A paired t-test was used to confirm the significance of the DDPM 510 improvement relative to the other MAR techniques.

For a more clinically relevant performance evaluation, four clinical datasets were combined with realistic metal objects fitted to the respective subject. The MAR techniques were analyzed in terms of CT number (CTN) bias and noise, as well as anatomical accuracy. CT number stability was quantified using the CT number RMSE within the subject skin-line ($RMSE_{INT}$) excluding the surrounding air and patient couch, and in a region-specific organ contour ($RMSE_{ROI}$): prostate (excluding the metal) in the pelvis, spinal cord in the head & neck, and heart in the thorax. In addition, we compared CT numbers and their variation in homogenous tissue regions affected by artifacts, located between the metal objects as well as further away. Anatomical accuracy was evaluated using the SSIM within the patient skin-line ($SSIM_{INT}$) as well as using the volume estimates of the metal object ($CTN_M$>2500 HU) and the subjects' bone structure (150 HU≤$CTN_B$<1000 HU).

Figure 14:
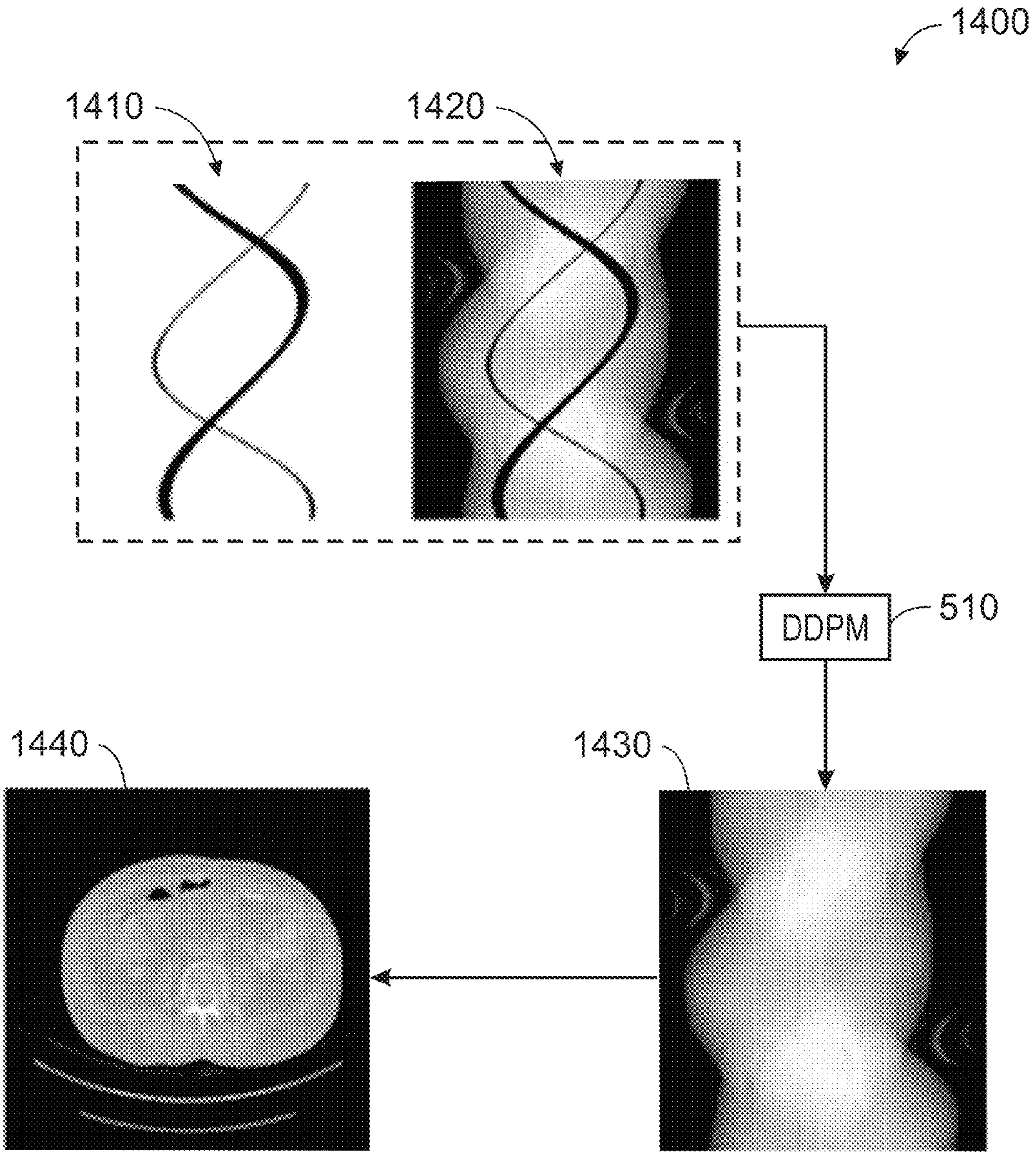
FIG. 14 is a diagram of an example process for MAR in CT images using a DDPM.

FIG. 14 is a diagram of an example process 1400 for MAR in CT images using a DDPM. As shown in FIG. 14, the DDPM 510 may acquire a mask sinogram 1410 and a corrupted sinogram 1420 that includes a removed corrupted region. The DDPM 510 may generate a corrected sinogram 1430, and may generate a corrected CT image 1440 based on the corrected sinogram 1430.

Figure 15:
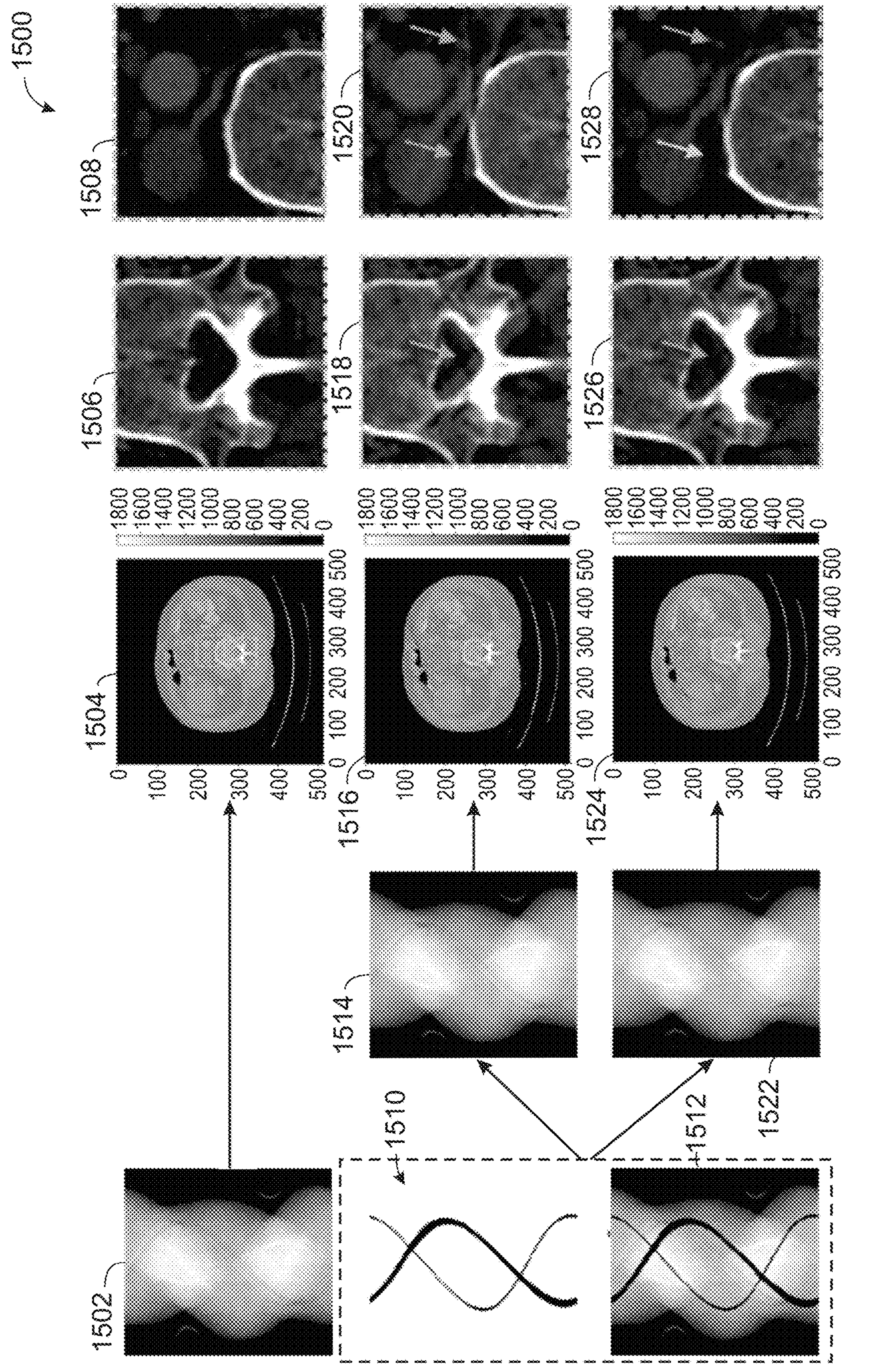
FIG. 15 is a diagram of an example process for MAR in CT images using normalized MAR (NMAR) and a DDPM.

FIG. 15 is a diagram of an example process 1500 for MAR in CT images using NMAR and a DDPM. As shown in FIG. 15, the imaging system 110 may acquire a sinogram 1502, and generate a CT image 1504 including a first region 1506 and a second region 1508. The MAR model 530 may acquire a mask sinogram 1510 and a corrupted sinogram 1512 including a removed corrupted region, generate a corrected sinogram 1514, and generate a corrected CT image 1516. The corrected CT image 1516 may include a first region 1518 and a second region 1520. The DDPM 510 may acquire the mask sinogram 1510 and the corrupted sinogram 1512 including the removed corrupted region, generate a corrected sinogram 1522, and generate a corrected CT image 1524. The corrected CT image 1524 may include a first region 1526 and a second region 1528. According to an embodiment, the DDPM 510 may generate the corrected CT image 1524 that includes less severe artifacts and higher similarity to the CT image 1504 as compared to the corrected CT image 1516 generated by the MAR model 530. For example, the corrected CT image 1524 may include a higher SSIM (0.963±0.019 versus 0.941±0.036) and a lower MSE (18.869±14.104 versus 29.299±22.264).

Figure 16A:
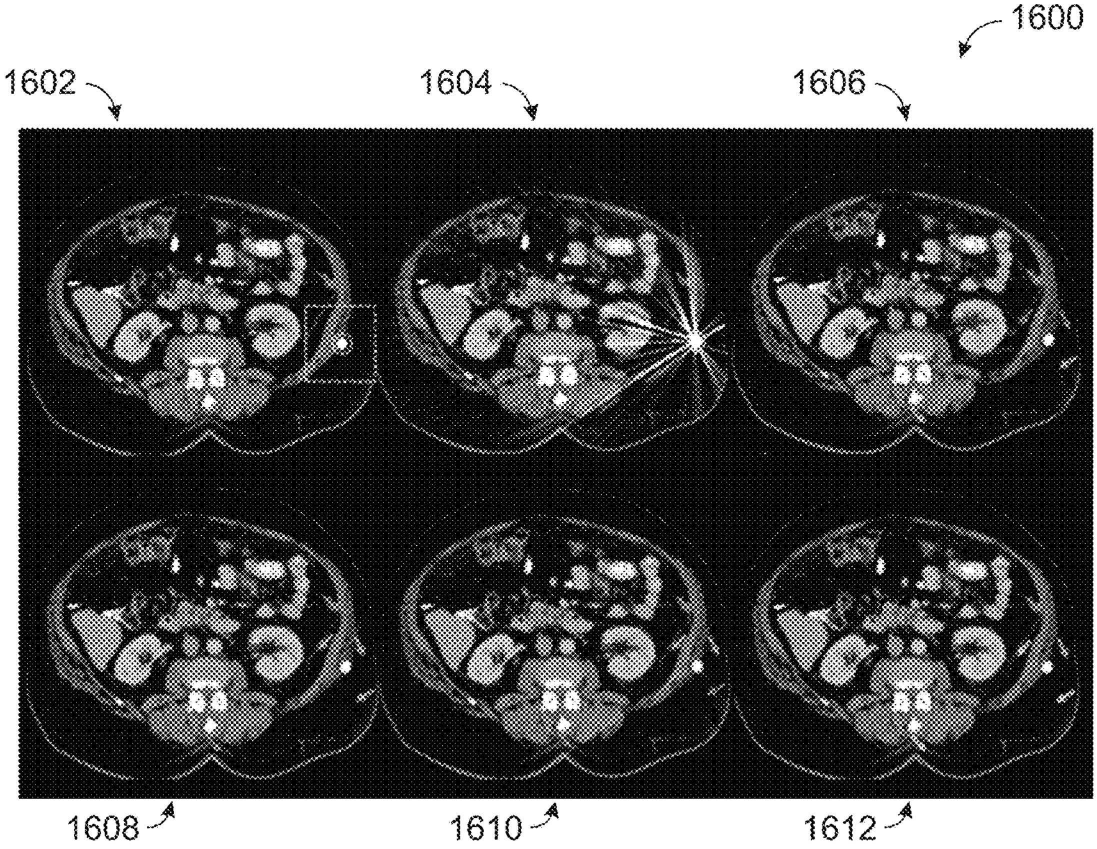
FIGS. 16A and 16B are diagrams of CT images of an abdomen generated using techniques described herein.
Figure 16B:
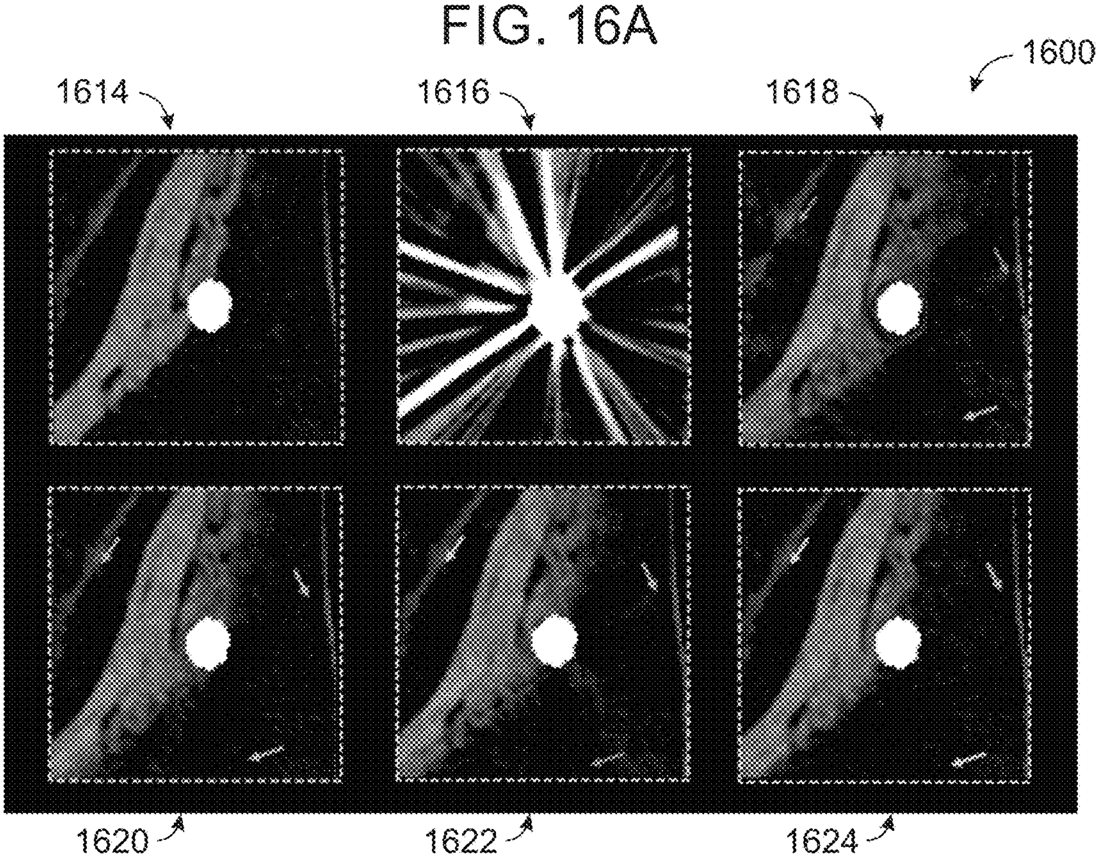

FIGS. 16A and 16B are diagrams 1600 of CT images of an abdomen generated using techniques described herein. FIGS. 16A and 16B depict the performance of the DDPM 510, the AI models 520, and the MAR model 530 in an abdominal CT scan of the test dataset with a single simulated metal object. Reference number 1602 illustrates an example of a CT image resulting from a sinogram without a metal object. The respective simulated metal object, indicated by a yellow circle, is overlaid with the maximum grayscale value. Reference number 1604 shows the respective corrupted CT image. A realistic metal simulation was carried out to visualize the metal artifacts. Reference numbers 1606, 1608, 1610, and 1612 illustrate the MAR-corrected CT images resulting from the MAR model 530, AI model 520 (e.g., PUnet), AI model 520 (e.g., GAN), and DDPM 510, respectively. Reference numbers 1614, 1616, 1618, 1620, 1622, and 1624 demonstrate magnified versions of the CT images of reference numbers 1606, 1608, 1610, and 1612, in a region around the virtual metal trace. The location of the magnified region corresponds to the green dashed rectangle, overlaid on the CT image of reference number 1602. The red, orange, and green colored arrows correspond to high, intermediate, and low degree of metal artifact presence. The DDPM 510 and the AI models 520 may outperform the MAR model 530, and the DDPM 510 may outperform the AI models 520.

The table shown below summarizes the mean and standard deviation of the metrics for the test dataset (N=200). The MAR model 530 (e.g., NMAR) marked the lowest SSIM, PSNR and highest RMSE, indicating the lowest quality MAR correction. In addition, NMAR provided the highest standard deviation values for each metric, indicating variable performance across the different images, compared to the AI models 520 and the DDPM 510.

| | SSIM | PSNR | RMISE |
|---|---|---|---|
| NMAR | 0.920 ± 0.071 | 42.12 ± 5.94 | 20.2 ± 19.7 |
| PUnet | 0.945 ± 0.050 | 44.84 ± 4.89 | 13.7 ± 9.6 |

-continued

| | SSIM | PSNR | RMISE |
|---|---|---|---|
| GAN | 0.959 ± 0.039 | 45.74 ± 5.22 | 12.6 ± 9.6 |
| DDPM | 0.964 ± 0.032 | 46.16 ± 5.88 | 12.3 ± 10.4 |

Paired t-test revealed significantly higher SSIM in the case of the DDPM 510 versus the AI model 520 (e.g., GAN) ($p<10^{-6}$, DF 199, paired SD 0.012), the AI model 520 (e.g., PUnet) ($p<10^{-25}$, DF 199, paired SD 0.021), and the MAR model 530 (e.g., NMAR) ($p<10^{-26}$, DF 199, paired SD 0.048), indicating improved structural similarity between the paired groups of DDPM corrected and ground truth images, as compared to the other MAR techniques. In addition, the DDPM 510 had significantly higher PSNR compared to GAN ($p<0.05$, DF 199, paired SD 2.81), PUnet ($p<10^{-9}$, DF 199, paired SD 2.80) and NMAR ($p<10^{-21}$, DF 199, paired SD 5.31), demonstrating the capability to provide higher quality MAR corrected images. Finally, RMSE was significantly lower in the case of DDPM, compared to NMAR ($p<0.001$, DF 199, paired SD 4.39), however no significant differences were found against PUnet and GAN.

Figure 17:
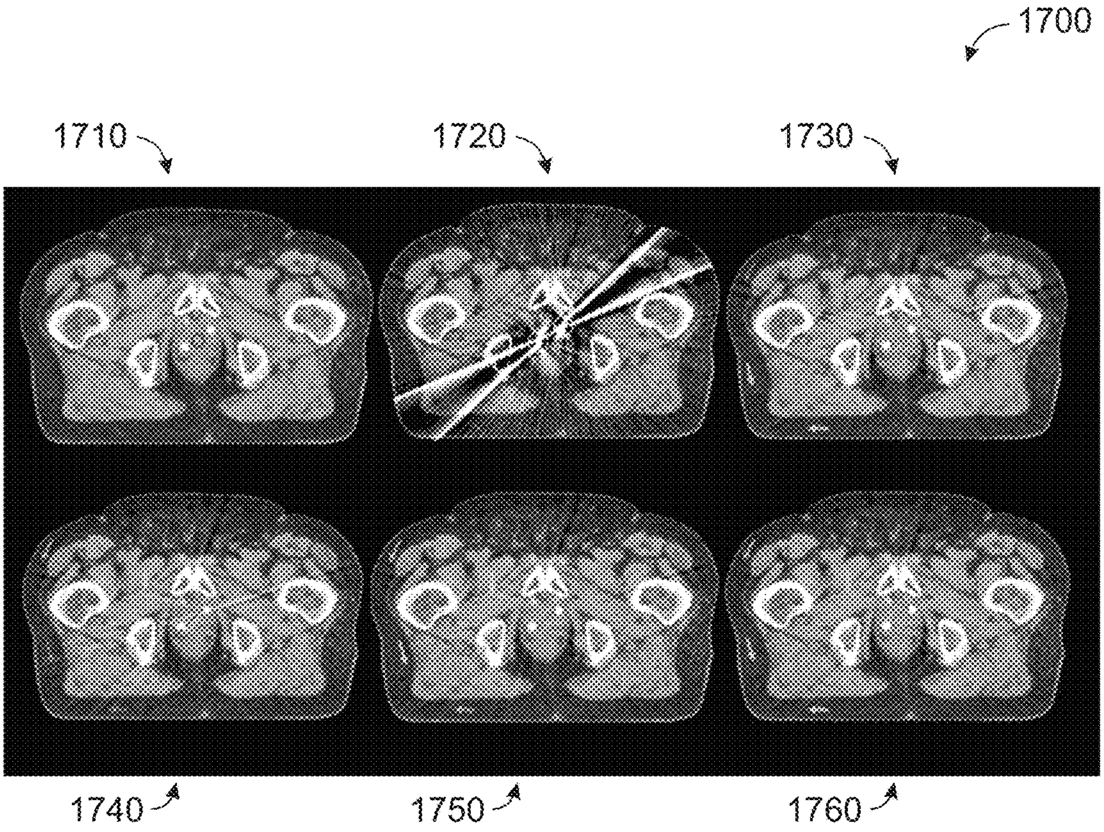
FIG. 17 is a diagram of CT images of a pelvis generated using techniques described herein.
Figure 18:
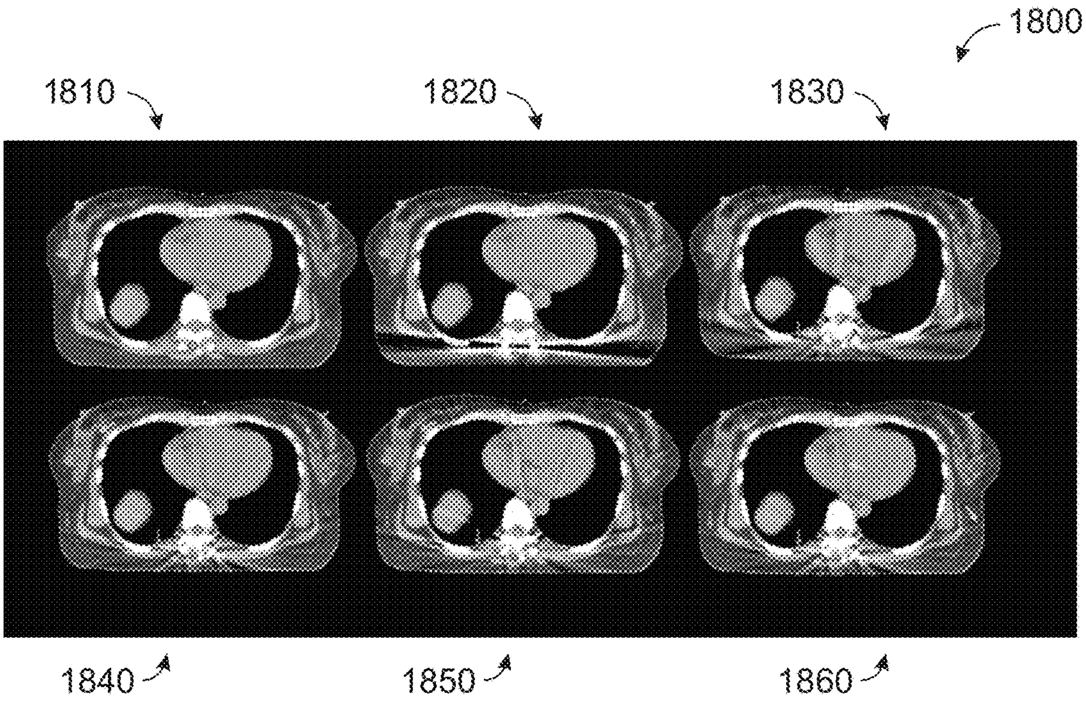
FIG. 18 is a diagram of CT images of a thorax generated using techniques described herein.
Figure 19:
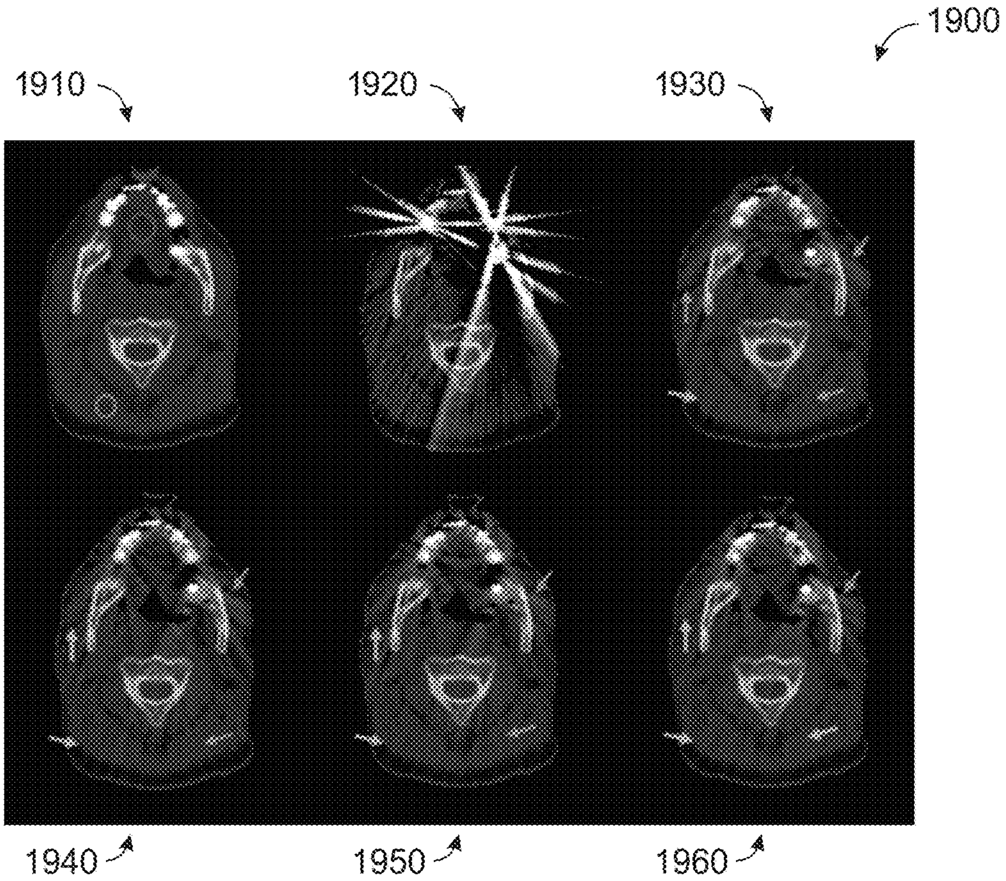
FIG. 19 is a diagram of CT images of a head generated using techniques described herein.
Figure 20:
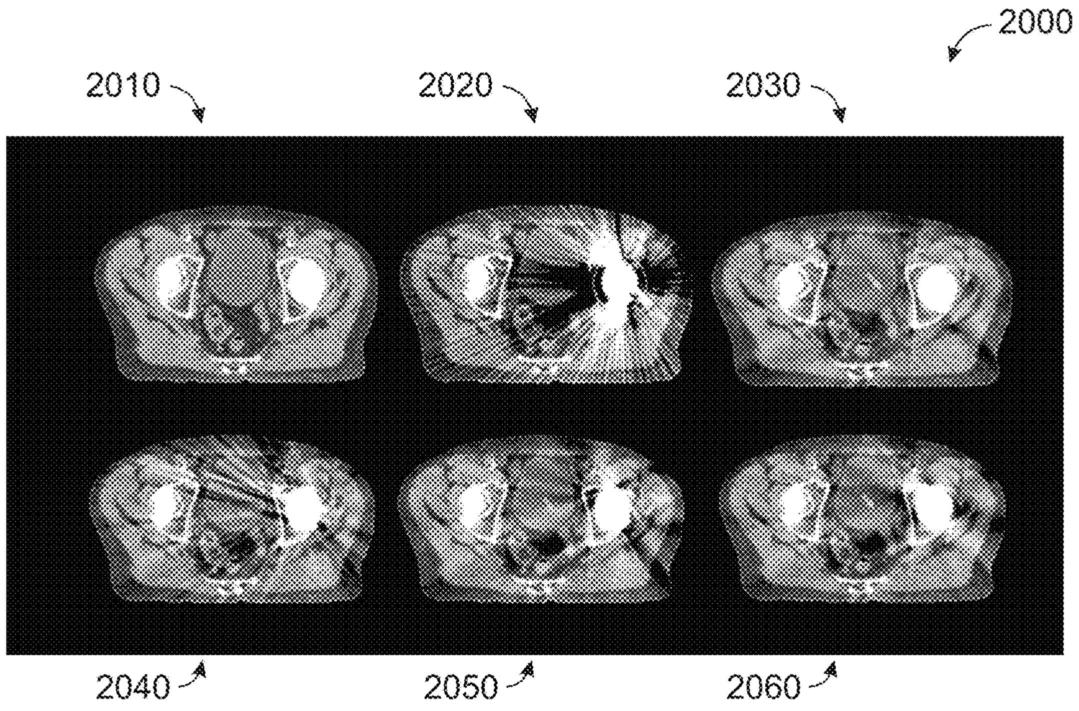
FIG. 20 is a diagram of CT images of a hip generated using techniques described herein.

FIG. 17 is a diagram 1700 of CT images of a pelvis generated using techniques described herein. FIG. 18 is a diagram 1800 of CT images of a thorax generated using techniques described herein. FIG. 19 is a diagram 1900 of CT images of a head generated using techniques described herein. FIG. 20 is a diagram 2000 of CT images of a hip generated using techniques described herein. FIGS. 17-20 show the realistic clinical evaluation images including metal-free, corrupted/uncorrected, and MAR corrected images, for pelvis (subject 1), thorax (subject 2), head (subject 3) and hip (subject 4), respectively.

A metal-free ground truth CT image is shown in FIGS. 17-20 by reference numbers 1710, 1810, 1910, and 2010, respectively. A corrupted CT image is shown in FIGS. 17-20 by reference numbers 1720, 1820, 1920, and 2020, respectively. A CT image generated by the MAR model 530 (e.g., NMAR model) is shown in FIGS. 17-20 by reference numbers 1730, 1830, 1930, and 2030, respectively. A CT image generated by an AI model 520 (e.g., PUnet model) is shown in FIGS. 17-20 by reference numbers 1740, 1840, 1940, and 2040, respectively. A CT image generated by an AI model 520 (e.g., GAN model) is shown in FIGS. 17-20 by reference numbers 1750, 1850, 1950, and 2050, respectively. A CT image generated by the DDPM 510 is shown in FIGS. 17-20 by reference numbers 1760, 1860, 1960, and 2060, respectively.

The blue and orange rings overlaid in the ground truth CT image of each of FIGS. 17-20 denote the ROIs in regions affected by metal artifacts for which the performance metrics related to the CT number ($CTN_{blue}$ in close proximity to the metal objects and $CTN_{orange}$ farther away) were calculated. For the pelvis scan, the DDPM corrected reconstruction had the best visual image quality, with almost no remaining streak artifacts (FIG. 17). In the head and thorax scans, the DDPM visual image quality was more similar but still slightly better than the other methods (FIGS. 18 and 19). In the case of total hip replacement (FIG. 20), the DDPM 510 provided better visual image quality compared to the AI model 520 (e.g., PUnet and GAN).

The table shown below summarizes the clinically relevant performance metrics in each of the four clinical scans.

| | | Gr. Tr. | Uncorr. | NMAR | PUnet | GAN | DDPM |
|---|---|---|---|---|---|---|---|
| Subject 1 - Pelvis | $SSIM_{INT}$ | 1 | 0.783 | 0.985 | 0.982 | 0.987 | 0.989 |
| | $RMSE_{INT}$ | 0 | 178 | 15 | 16 | 13 | 11 |
| | $RMSE_{ROI}$ | 0 | 698 | 20 | 40 | 21 | 20 |
| | $CTN_{blue}$ | 43 ± 15 | 279 ± 900 | 40 ± 18 | 42 ± 45 | 39 ± 24 | 39 ± 22 |
| | $CTN_{orange}$ | −93 ± 15 | −123 ± 35 | −95 ± 22 | −90 ± 23 | −94 ± 21 | −93 ± 16 |
| | $Vol_M$ | 0.095 | 0.347 | 0.323 | 0.323 | 0.323 | 0.323 |
| | $Vol_B$ | 9.41 | 16.2 | 9.63 | 9.73 | 9.58 | 9.50 |
| Subject 2- Thorax | $SSIM_{INT}$ | 1 | 0.921 | 0.938 | 0.974 | 0.969 | 0.967 |
| | $RMSE_{INT}$ | 0 | 86 | 36 | 24 | 26 | 26 |
| | $RMSE_{ROI}$ | 0 | 9 | 17 | 11 | 13 | 10 |
| | $CTN_{blue}$ | 76 ± 20 | −285 ± 788 | 88 ± 92 | 112 ± 48 | 96 ± 45 | 79 ± 43 |
| | $CTN_{orange}$ | −68 ± 13 | −34 ± 22 | −100 ± 29 | −74 ± 17 | −74 ± 19 | −76 ± 14 |
| | $Vol_M$ | 0.162 | 0.281 | 0.331 | 0.331 | 0.331 | 0.331 |
| | $Vol_B$ | 8.36 | 10.88 | 9.00 | 8.73 | 8.72 | 8.83 |
| Subject 3 - Head | $SSIM_{INT}$ | 1 | 0.401 | 0.842 | 0.848 | 0.834 | 0.858 |
| | $RMSE_{INT}$ | 0 | 605 | 93 | 87 | 94 | 89 |
| | $RMSE_{ROI}$ | 0 | 361 | 44 | 48 | 50 | 43 |
| | $CTN_{blue}$ | 22 ± 30 | 13 ± 1300 | 10 ± 52 | 1 ± 44 | 17 ± 71 | 11 ± 55 |
| | $CTN_{orange}$ | 60 ± 10 | 101 ± 210 | 77 ± 16 | 78 ± 23 | 79 ± 16 | 67 ± 15 |
| | $Vol_M$ | 0.322 | 1.511 | 0.108 | 0.110 | 0.106 | 0.106 |
| | $Vol_B$ | 5.77 | 11.58 | 8.37 | 8.37 | 8.64 | 8.30 |
| Subject 4 - Hip | $SSIM_{INT}$ | 1 | 0.646 | 0.859 | 0.788 | 0.780 | 0.800 |
| | $RMSE_{INT}$ | 0 | 228 | 113 | 148 | 123 | 147 |
| | $RMSE_{ROI}$ | 0 | 123 | 36 | 77 | 51 | 52 |
| | $CTN_{blue}$ | −20 ± 49 | 297 ± 144 | 10 ± 35 | 21 ± 63 | 38 ± 70 | −32 ± 56 |
| | $CTN_{orange}$ | 57 ± 28 | 102 ± 49 | −10 ± 31 | 0 ± 37 | −52 ± 47 | 48 ± 29 |
| | $Vol_M$ | 1.967 | 2.093 | 2.050 | 2.147 | 2.062 | 2.147 |
| | $Vol_B$ | 3.197 | 7.310 | 3.400 | 4.447 | 4.375 | 4.185 |

The DDPM 510 had the best performance for most metrics. The DDPM 510 outperformed the other techniques in all metrics related to the CT scan of the pelvis. In most scenarios, the DDPM 510 achieved the highest CT number accuracy in close proximity to the metal object ($CTN_{blue}$). In the case of the total hip replacement, the MAR model 530 (e.g., NMAR) marked best performance in most metrics, indicating that significantly larger metal objects may pose a challenge for the AI models 520 and the DDPM 510. At the same time, the DDPM 510 was the only technique that correctly identified the negative CT numbers of the bone marrow adipose tissue in close proximity to the hip implant. Differences between methods in the organ-specific CT numbers were on the level of noise; in the homogenous tissue regions larger differences were observable, with the DDPM 510 being closest to ground truth in the pelvis and thorax scans.

The DDPM 510 demonstrated significantly improved MAR capabilities as compared to the baseline MAR model 530, and the AI models 520 (e.g., the CNN and GAN) for image inpainting. The MAR model 530 performed generally poorer in most cases and had more variation in performance as compared to the deep-learning-based techniques. The overall performance of this hand-crafted method depends on the accuracy of the first-pass reconstruction, the tissue segmentation, and the analytical interpolation, all of which are approximations and can lead to imperfect artifact correction and new artifact introductions. The AI techniques might only be limited by the representation power of the networks and the richness of the training data.

A significant advantage presented by the embodiments herein is the unconditional training of the DDPM 510, which might not use any information on the metal trace during the training process. The trained DDPM 510 uses the mask sinogram solely during inference to generate the missing sinogram information, which renders the DDPM 510 less dependent on the metal position and geometry, as compared to the AI model 520 that is trained on a certain distribution of mask sinograms in a supervised manner. For instance, the AI models 520 (e.g., PUnet and GAN) might not perform as well as the DDPM 510 in the clinical CT scans with realistic metal objects, which were unseen during the training process. The DDPM 510 may also have higher training stability over AI models 520, and may have robustness to mode collapse ensuring a more diverse and representative set of generated information.

The DDPM 510 may have increased performance for smaller objects, and might be less effective in reducing metal artifacts caused by a significantly larger object. Accurate sinogram completion might be challenging when large regions are corrupted. To address this concern, the DDPM 510 may use patch-based training and inferencing, where the DDPM 510 may progressively generate smaller parts of the missing information in overlapping patches of the sinogram, and blend the results to achieve seamless sinogram completion. Moreover, using smaller sinogram patches may reduce the number of model parameters, as compared to processing the entire sinogram at once. This reduction in model capacity may potentially enable simpler learning of image features, better local context representation, and enhanced generalization. The DDPM 510 may improve efficiency by using pre-trained auto-encoders to lower the dimension of the input sinograms, and apply the DDPM 510 in latent space.

The imaging system 110 have multi-row detectors and may use helical scan protocols. The embodiments herein may be applied in 3D on a row-by-row basis, which can improve the efficacy of estimation of missing sinogram. The DDPM 510 may be trained and inferenced on cubic patches of smaller dimension or on stacks of 2D sinograms.

According to an embodiment, the DDPM 510 may use the mask sinogram during training. For example, the DDPM 510 may use a supervised image inpainting method (e.g., PALETTE). PALETTE feeds the corrupted image to the DDPM 510 at each diffusion step during the training process. This supervised training approach may enable the DDPM 510 to learn features specific to metal-induced distortions, which potentially enhances MAR capabilities in metal objects that resemble the training distribution.

An embodiment may utilize a combination of the AI model 520 and the DDPM 510. For example, the DDPM 510 may act as generator, and the AI model 520 (e.g., GAN) may act as a discriminator. Additionally, or alternatively, an embodiment may use an ensemble of DDPMs 510, and use a GAN discriminator to evaluate quality of the corrected sinograms generated by the DDPMs 510 during inferencing and select the best solution. Although the embodiments herein correct metal artifacts in the sinogram domain, an embodiment may correct metal artifacts in a dual-domain MAR method combining the benefits of sinogram-domain and image-domain approaches.

Figure 21:
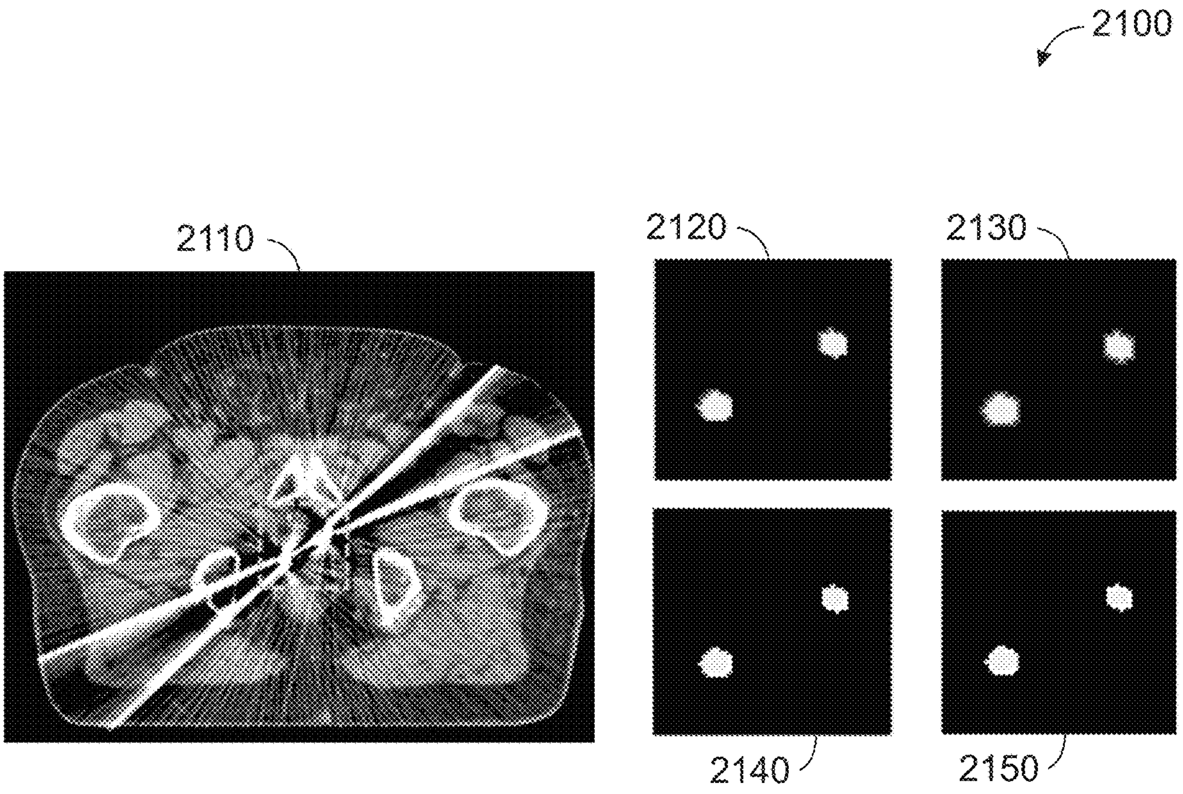
FIG. 21 is a diagram of a CT image of a pelvis and segmentation masks.

FIG. 21 is a diagram 2100 of a CT image of a pelvis and segmentation masks. Reference number 2110 is a clinical CT image of the pelvis with two virtually placed gold marker implants in the prostate. Reference numbers 2120, 2130, 2140, and 2150 depict metal segmentation masks with ratios of segmented area to actual metal trace area equal to 1.4, 1.8, 0.7 and 0.5, respectively. The segmentation masks are overlaid in green color on top of a binary mask depicting the ground truth metal trace geometry.

The metal trace was segmented as regions exceeding 3000 HU, and the size of the segmentation mask was manipulated using image morphological operations. Four different cases of segmentation mismatch were created, with ratios of segmented area to actual metal trace area equal to 1) 1.4, 2) 1.8, 3) 0.7 and 4) 0.5, as illustrated by reference numbers 2120, 2130, 2140, and 2150, respectively. The segmentation masks were used to obtain mask sinograms, which were in turn used to apply the DDPM-based MAR correction.

The table below summarizes the SSIM, PSNR, and RMSE of the MAR corrected image calculated using each of the metal masks, as well as the ground truth metal trace. It can be observed that using masks of larger area has a lesser impact on the MAR quality based on all three metrics, as compared to those with smaller area. This highlights the importance of ensuring that segmentation masks effectively exclude any residual metal corrupted data. Using a mask with 1.8 times the area of the actual size resulted in slightly lower PSNR and higher RMSE, compared to the one with 1.4 the area, which underlines that higher segmentation accuracy leads to more effective MAR.

| | Segmented to ground truth area ratio (R) | | | | |
|---|---|---|---|---|---|
| | Gr. Truth | R = 1.4 | R = 1.8 | R = 0.7 | R = 0.5 |
| SSIM | 0.957 | 0.908 | 0.908 | 0.545 | 0.538 |
| PSNR | 47.34 | 45.02 | 44.92 | 16.91 | 17.02 |
| RMSE | 7.57 | 11.45 | 11.63 | 54.82 | 57.69 |

In this way, the DDPM 510 may estimate missing sinogram data for CT MAR. The DDPM 510 may be unconditionally trained without using information regarding the metal corrupted data, which can potentially provide enhanced generalization capabilities across various types of metal objects. The DDPM 510 was compared to the MAR model 530 (e.g., NMAR) and two AI models 520 (e.g., PUnet and GAN). The results were evaluated using standard computer vision metrics in a test dataset of 200 images. In addition, the methods were evaluated using a series of clinically relevant performance metrics in four clinical CT scans with realistic metal objects and artifacts. In general, the AI models 520 outperformed the MAR model 530. Further, the DDPM 510 outperformed the AI models 520. The DDPM 510 was capable of effectively reducing metal artifacts in all test cases and following all different performance metrics. The embodiments herein enhance the state of the art in MAR, and improve the diagnostic accuracy of CT scans.

Embodiments of the present disclosure shown in the drawings and described above are example embodiments only and are not intended to limit the scope of the appended claims, including any equivalents as included within the scope of the claims. Various modifications are possible and will be readily apparent to the skilled person in the art. It is intended that any combination of non-mutually exclusive features described herein are within the scope of the present invention. That is, features of the described embodiments can be combined with any appropriate aspect described above and optional features of any one aspect can be combined with any other appropriate aspect. Similarly, features set forth in dependent claims can be combined with non-mutually exclusive features of other dependent claims, particularly where the dependent claims depend on the same independent claim. Single claim dependencies may have been used as practice in some jurisdictions require them, but this should not be taken to mean that the features in the dependent claims are mutually exclusive.

What is claimed is:

1. A method comprising:

acquiring a corrupted computed tomography (CT) image, of a region of interest (ROI) of a subject, including artifacts caused by a metal object in the subject;

generating a corrupted sinogram, corresponding to the corrupted CT image, including a corrupted region of corrupted data caused by the metal object and an uncorrupted region of uncorrupted data;

generating a mask sinogram that delineates the corrupted region of the corrupted data;

generating a corrected sinogram including the uncorrupted region of the uncorrupted data and an inpainted region of inpainted data corresponding to the corrupted region, using a denoising diffusion probabilistic model (DDPM), the corrupted sinogram, and the mask sinogram;

generating a corrected CT image, of the ROI of the subject, that includes reduced artifacts relative to the artifacts in the corrupted CT image, based on the corrected sinogram; and displaying the corrected CT image.

2. The method of claim 1, wherein the DDPM is trained only using training CT images that do not depict metal objects.

3. The method of claim 1, wherein the DDPM is trained using a forward diffusion process in which noise is added to a training sinogram at multiple time steps, and using a reverse diffusion process that removes the noise that was added to the training sinogram during the forward diffusion process.

4. The method of claim 1, further comprising:

removing the corrupted data from the corrupted sinogram; and inpainting the inpainted region, wherein the generating the corrected sinogram comprises generating the corrected sinogram based on inpainting the inpainted region.

5. The method of claim 4, further comprising:

sampling the uncorrupted data from the uncorrupted region using a forward diffusion process;

sampling the inpainted data from the inpainted region using a reverse diffusion process; and combining the uncorrupted data and the inpainted data, wherein the generating the corrected sinogram comprises generating the corrected sinogram based on combining the uncorrupted data and the inpainted data.

6. The method of claim 1, further comprising:

segmenting the metal object in the corrupted CT image, wherein the generating the mask sinogram comprises generating the mask sinogram based on segmenting the metal object in the corrupted CT image.

7. The method of claim 1, further comprising:

segmenting the corrupted region of the corrupted sinogram, wherein the generating the mask sinogram comprises generating the mask sinogram based on segmenting the corrupted region of the corrupted sinogram.

8. An imaging system comprising:

a memory configured to store instructions; and one or more processors configured to execute the instructions to perform operations comprising:

acquiring a corrupted computed tomography (CT) image, of a region of interest (ROI) of a subject, including artifacts caused by a metal object in the subject;

generating a corrupted sinogram, corresponding to the corrupted CT image, including a corrupted region of corrupted data caused by the metal object and an uncorrupted region of uncorrupted data;

generating a mask sinogram that delineates the corrupted region of the corrupted data;

generating a corrected sinogram including the uncorrupted region of the uncorrupted data and an inpainted region of inpainted data corresponding to the corrupted region, using a denoising diffusion probabilistic model (DDPM), the corrupted sinogram, and the mask sinogram;

generating a corrected CT image, of the ROI of the subject, that includes reduced artifacts relative to the artifacts in the corrupted CT image, based on the corrected sinogram; and displaying the corrected CT image.

9. The imaging system of claim 8, wherein the DDPM is trained only using training CT images that do not depict metal objects.

10. The imaging system of claim 8, wherein the DDPM is trained using a forward diffusion process in which noise is added to a training sinogram at multiple time steps, and using a reverse diffusion process that removes the noise that was added to the training sinogram during the forward diffusion process.

11. The imaging system of claim 8, wherein the operations further comprise:

removing the corrupted data from the corrupted sinogram; and inpainting the inpainted region, wherein the generating the corrected sinogram comprises generating the corrected sinogram based on inpainting the inpainted region.

12. The imaging system of claim 11, wherein the operations further comprise:

sampling the uncorrupted data from the uncorrupted region using a forward diffusion process;

sampling the inpainted data from the inpainted region using a reverse diffusion process; and combining the uncorrupted data and the inpainted data, wherein the generating the corrected sinogram comprises generating the corrected sinogram based on combining the uncorrupted data and the inpainted data.

13. The imaging system of claim 8, wherein the operations further comprise:

segmenting the metal object in the corrupted CT image, wherein the generating the mask sinogram comprises generating the mask sinogram based on segmenting the metal object in the corrupted CT image.

14. The imaging system of claim 8, wherein the operations further comprise:

segmenting the corrupted region of the corrupted sinogram, wherein the generating the mask sinogram comprises generating the mask sinogram based on segmenting the corrupted region of the corrupted sinogram.

15. A non-transitory computer-readable medium storing instructions that, when executed by one or more processors of an imaging system, cause the one or more processors to perform operations comprising:

acquiring a corrupted computed tomography (CT) image, of a region of interest (ROI) of a subject, including artifacts caused by a metal object in the subject;

generating a corrupted sinogram, corresponding to the corrupted CT image, including a corrupted region of corrupted data caused by the metal object and an uncorrupted region of uncorrupted data;

generating a mask sinogram that delineates the corrupted region of the corrupted data;

generating a corrected sinogram including the uncorrupted region of the uncorrupted data and an inpainted region of inpainted data corresponding to the corrupted region, using a denoising diffusion probabilistic model (DDPM), the corrupted sinogram, and the mask sinogram;

generating a corrected CT image, of the ROI of the subject, that includes reduced artifacts relative to the artifacts in the corrupted CT image, based on the corrected sinogram; and displaying the corrected CT image.

16. The non-transitory computer-readable medium of claim 15, wherein the DDPM is trained only using training CT images that do not depict metal objects.

17. The non-transitory computer-readable medium of claim 15, wherein the DDPM is trained using a forward diffusion process in which noise is added to a training sinogram at multiple time steps, and using a reverse diffusion process that removes the noise that was added to the training sinogram during the forward diffusion process.

18. The non-transitory computer-readable medium of claim 15, wherein the operations further comprise:

removing the corrupted data from the corrupted sinogram; and inpainting the inpainted region, wherein the generating the corrected sinogram comprises generating the corrected sinogram based on inpainting the inpainted region.

19. The non-transitory computer-readable medium of claim 18, wherein the operations further comprise:

sampling the uncorrupted data from the uncorrupted region using a forward diffusion process;

sampling the inpainted data from the inpainted region using a reverse diffusion process; and combining the uncorrupted data and the inpainted data, wherein the generating the corrected sinogram comprises generating the corrected sinogram based on combining the uncorrupted data and the inpainted data.

20. The non-transitory computer-readable medium of claim 15, wherein the operations further comprise:

segmenting the metal object in the corrupted CT image, wherein the generating the mask sinogram comprises generating the mask sinogram based on segmenting the metal object in the corrupted CT image.

* * * * *